(12) United States Patent
Grant et al.

(10) Patent No.: US 8,903,935 B2
(45) Date of Patent: Dec. 2, 2014

(54) REMOTE DIRECT MEMORY ACCESS OVER DATAGRAMS

(76) Inventors: Ryan Eric Grant, Kingston (CA);
Mohammad Javad Rashti, Miamisburg, OH (US); Pavan Balaji, Chicago, IL (US); Ahmad Afsahi, Kingston (CA)

( * ) Notice: Subject to any disclaimer, the term of this patent is extended or adjusted under 35 U.S.C. 154(b) by 234 days.

(21) Appl. No.: 13/330,423

(22) Filed: Dec. 19, 2011

(65) Prior Publication Data
US 2012/0265837 A1 Oct. 18, 2012

Related U.S. Application Data

(60) Provisional application No. 61/424,091, filed on Dec. 17, 2010.

(51) Int. Cl.
*G06F 15/167* (2006.01)
*H04L 29/08* (2006.01)

(52) U.S. Cl.
CPC .................................... *H04L 67/025* (2013.01)
USPC ............ 709/212; 709/217; 709/218; 709/219

(58) Field of Classification Search
CPC .................. H04L 2012/5645; H04L 67/1097; H04L 29/08009
USPC .................................. 709/212, 217, 218, 219
See application file for complete search history.

(56) References Cited

U.S. PATENT DOCUMENTS

| 2002/0085562 | A1* | 7/2002 | Hufferd et al. | 370/392 |
|---|---|---|---|---|
| 2005/0015469 | A1* | 1/2005 | Zuberi | 709/220 |
| 2006/0075057 | A1* | 4/2006 | Gildea et al. | 709/212 |
| 2006/0075067 | A1* | 4/2006 | Blackmore et al. | 709/217 |
| 2006/0230119 | A1* | 10/2006 | Hausauer et al. | 709/216 |
| 2009/0138574 | A1* | 5/2009 | Hui et al. | 709/219 |
| 2009/0292861 | A1* | 11/2009 | Kanevsky et al. | 711/103 |
| 2010/0146068 | A1* | 6/2010 | Haviv | 709/212 |
| 2010/0183024 | A1* | 7/2010 | Gupta | 370/463 |
| 2011/0106905 | A1* | 5/2011 | Frey et al. | 709/212 |
| 2011/0270943 | A1* | 11/2011 | Frey et al. | 709/212 |

* cited by examiner

*Primary Examiner* — Tammy Nguyen
*Assistant Examiner* — Jonathan Bui
(74) *Attorney, Agent, or Firm* — Jeffrey M. Furr, Esq.; Furr Law Firm

(57) ABSTRACT

A communication stack for providing remote direct memory access (RDMA) over a datagram network is disclosed. The communication stack has a user level interface configured to accept datagram related input and communicate with an RDMA enabled network interface card (NIC) via an NIC driver. The communication stack also has an RDMA protocol layer configured to supply one or more data transfer primitives for the datagram related input of the user level. The communication stack further has a direct data placement (DDP) layer configured to transfer the datagram related input from a user storage to a transport layer based on the one or more data transfer primitives by way of a lower layer protocol (LLP) over the datagram network.

29 Claims, 18 Drawing Sheets

REMOTE DIRECT MEMORY ACCESS OVER DATAGRAMS

RELATED APPLICATIONS

This application claims priority to U.S. Provisional Application Ser. No. 61/424,091, filed Dec. 17, 2010 and entitled "Remote Direct Memory Access Over Datagrams." The 61/424,091 application is hereby incorporated by reference in its entirety.

GOVERNMENT RIGHTS

This invention was made with government support under 1) Grant #RGPIN/238964-2005 from the Natural Sciences and Engineering Research Council of Canada; 2) Grant #7154 from the Canada Foundation for Innovation and Ontario Innovation Trust; 3) Contract DE-AC02-06CH11357 from the Office of Advanced Scientific Computing Research, Office of Science, U.S. Department of Energy; and 4) Grant #0702182 from the National Science Foundation. The Government has certain rights in the invention.

FIELD

The claimed invention relates to remote direct memory access (RDMA), and more specifically to unreliable RDMA over datagrams.

BACKGROUND

Despite recognized performance inefficiencies, Ethernet currently accounts for more than half of the interconnection networks in the top five hundred supercomputers due to its easy deployment and low cost of ownership. Ethernet is ubiquitously used in commercial and research clusters, serving high performance computing (HPC) and datacenter systems. Unfortunately, the large overhead that Gigabit and 10-Gigabit Ethernet network protocol processing puts on the central processing (CPU) cores has led to critical CPU availability and performance issues. For this, a wide range of efforts started to boost Ethernet efficiency, especially targeting its latency for HPC. The first major attempt was offloading transmission control protocol/internet protocol (TCP/IP) processing using stateless offload (e.g. offloading checksum, segmentation and reassembly, etc.) and stateful TCP Offload Engines (TOE).

Another major approach on top of TOE has been equipping Ethernet with techniques such as Remote Direct Memory Access (RDMA) and zero-copy communication that have traditionally been associated with other high performance interconnects such as InfiniBand. iWARP (Internet Wide Area RDMA Protocol) was the first standardized protocol to integrate such features into Ethernet, effectively reducing Ethernet latency and increasing host CPU availability by taking advantage of RDMA, kernel bypass capabilities, zero copy and non-interrupt based asynchronous communication. Rather than the traditional kernel level socket application program interface (API), iWARP provides a user-level interface that can be used in both local area network (LAN) and wide area network (WAN) environments, thus, efficiently bypassing kernel overheads such as data copies, synchronization and context switching.

Despite contributing to improving Ethernet efficiency, the current specification of iWARP lacks functionality to support the whole spectrum of Ethernet based applications. The current iWARP standard is only defined on reliable connection-oriented transports. Such a protocol suffers from scalability issues in large-scale applications due to memory requirements associated with multiple inter-process connections. In addition, some applications and data services do not require the reliability overhead and implementation complexity and cost associated with connection-oriented transports such as TCP.

It would therefore be desirable to have a method and system for implementing unreliable RDMA over datagrams.

iWARP Standard

Proposed by RDMA Consortium in 2002 to the Internet Engineering Task Force (IETF), the iWARP specification defines a multi-level processing stack on top of standard TCP/IP over Ethernet. The stack is designed to decouple the processing of Upper Layer Protocol (ULP) data from the operating system (OS) and reduce the host CPU utilization by avoiding intermediate copies during data transfer (zero copy). To achieve these goals, iWARP needs to be fully offloaded, for example on top of stateless and stateful TOE.

As illustrated in FIG. 1, at the top layer, iWARP provides a set of descriptive user-level interfaces called iWARP verbs. The verbs interface bypasses the OS kernel and is defined on top of an RDMA enabled stack. A network interface card (NIC) that supports the RDMA stack as described in iWARP standard is called an RDMA-enabled NIC or RNIC. An RNIC implements both iWARP stack and TOE functionality in hardware.

The RDMA protocol (RDMAP) layer supplies communication primitives for the verbs layer. Examples of data transfer primitives include Send, Receive, RDMA Write and RDMA Read that are passed as work requests (WR) to a Queue Pair (QP) data structure. The WRs are processed asynchronously by the RNIC, and completion is notified either by polled Completion Queue (CQ) entries or by event notification.

Verbs layer WRs are delivered in order from RDMAP to the lower layers. The Send and RDMA Write operations require a single message for data transfer, while the RDMA Read needs a request by the consumer (data sink), followed by a response from the supplier (data source). RDMAP is designed as a stream-based layer. Operations in the same stream are processed in the order of their submission.

The Direct Data Placement (DDP) layer is designed to directly transfer data from the user buffer to the network interface card (NIC) without intermediate buffering. The packet based DDP layer matches the data sink at the RDMAP layer with the incoming data segments based on two types of data placements models: tagged and untagged. The tagged model, used for one-sided RDMA Write and Read operations, has a sender-based buffer management in which the initiator provides a pre-advertised reference to the data buffer address at the remote side. The untagged model uses a two-sided Send/Receive semantic, where the receiver both handles buffer management and specifies the buffer address.

Due to DDP being a message-based protocol, out-of-order placement of message segments is possible, therefore DDP assures delivery of a complete message upon arrival of all segments. In the current iWARP specification, DDP assumes that the lower layer provides in order and correct delivery of messages.

The lower layer protocol (LLP) on which the iWARP stack is running can be either TCP or stream control transmission protocol (SCTP). Due to the message-oriented nature of DDP, the iWARP protocol requires an adaptation layer to put boundaries on DDP messages transferred over the stream oriented TCP protocol. The Marker PDU Alignment (MPA) protocol inserts markers into DDP data units prior to passing them to the TCP layer. It also re-assembles marked data units from the TCP stream and removes the markers before passing them to the DDP. The MPA layer is not needed on top of message-oriented transports such as SCTP or UDP because intermediate devices do not fragment message-based packets as they would with stream-based ones, removing the middle-box fragmentation issue that the MPA layer solves.

Shortcomings of the Current iWARP Standard

The current iWARP standard offers a range of capabilities that increase the efficiency of Ethernet in modern HPC and datacenters clusters. Taking advantage of the well-known reliable transports in the TCP/IP protocol suite is one of its key advantages. Reliability has in fact been a major force for designing the current iWARP standard on top of connection-oriented transports. The LLP in iWARP is assumed to be a point-to-point reliable stream, established prior to iWARP communication. This requirement makes it easy for the upper layer protocol (ULP) to assume reliable communication of user data. In addition, the independence of individual streams makes iWARP able to enforce error management on a per stream basis.

Such a standard is a fit for applications that require strict reliability at the lower layer, including data validation, flow control and in order delivery. Examples for such applications are reliable datacenter services such as database services, file servers, financial applications and policy enforcement systems (e.g. security applications, etc.).

On the other hand, there is a growing demand for applications that find the strict connection-based semantics of iWARP unnecessary. For such cases, the current iWARP standard imposes barriers to application scalability in large systems. The following subsections point to the shortcomings of the current standard and their relevant implications. As such, there is a strong need for RDMA with datagram transport.

Memory Usage.

The pervasiveness of the Ethernet in modern clusters places a huge demand on the scalability of the iWARP. The scale of high performance clusters is increasing rapidly and can soon reach to a million cores. A similar trend can be observed for datacenters. An obvious drawback of the connection-oriented iWARP is the connection memory usage that can exponentially grow with the number of processes. This dramatically increases the application's memory footprint, unveiling serious scalability issues for large-scale applications.

As the number of required connections increases, memory usage grows proportionately at different network stack layers. In a software implementation of iWARP at the TCP/IP layer, each connection will require a set of socket buffers allocated, in addition to the data structure required to maintain the connection state information. Although the socket buffers are not required in a hardware implementation of iWARP due to zero-copy on the fly processing of data, making a lot of connections will have other adverse effects. Due to limited RNIC cache for connection state information, maintaining out-of-cache connections will require extra memory requests by the RNIC. The other major place of memory usage is the application layer. Specifically, the communication libraries such as message passing interface (MPI) pre-allocate memory buffers per connection to be used for fast buffering and communication management.

Performance

In addition to memory usage problems, connection oriented protocols such as TCP, with their inherent flow-control and congestion management, limit performance. HPC applications running on a local cluster do not require the complexities of TCP flow and congestion management. User datagram protocol (UDP) offers a much lighter weight protocol that can significantly reduce the latency of individual messages, closing the latency gap between iWARP and other high speed interconnects. In addition, many datacenter applications such as those using media streaming protocols over WAN are currently running on top of unreliable datagram transports such as UDP. Due to such semantic discrepancies, the current connection-oriented specification of iWARP makes it impossible for such applications to take advantage of iWARP's major benefits such as zero copy and kernel bypass.

Fabrication Cost

The complexities associated with stream based lower layer protocols (LLPs) such as TCP and SCTP translate into expensive and non-scalable hardware implementations. This becomes especially important with modern multi-core systems where multiple processes could utilize the offloaded stack. A heavyweight protocol such as SCTP or even TCP can partially support multiple parallel on-node requests, due to implementation costs associated with hardware level parallelism.

Hardware Level Operations iWARP lacks useful operations such as hardware level multicast and broadcast. These operations, if supported, can be utilized in applications with MPI collectives and also media streaming services. iWARP does not support such operations primarily because the underlying TCP protocol is not able to handle multicast and broadcast operations.

Datagram-Based Applications

Despite the benefits offered by iWARP, many datacenter and web-based applications, such as stock-market trading and media-streaming applications, that rely on datagram-based semantics (mostly through UDP/IP) cannot take advantage of it because the iWARP standard is only defined over reliable, connection-oriented transports. Moreover, currently one-sided RDMA operations (such as RDMA Write) are only defined on reliable and connected transports. This effectively limits the number of applications that could utilize iWARP and its RDMA capabilities by excluding User Datagram Protocol (UDP), which according to Cisco Systems, could comprise more than 90% of all Internet consumer traffic by 2014.

Connection-based iWARP has a number of limitations that make it inappropriate for large-scale systems. First, the scalability of the current iWARP is limited since the hardware needs to keep data for each and every connection in hardware or host memory. This limits its effectiveness for applications that are required to service a very large number of clients at a single time. In addition, the current iWARP standard suffers from numerous overheads associated with connection-based transports such as Transmission Control Protocol (TCP) and Stream Control Transmission Protocol (SCTP) [21]. High overhead reliability and flow-control measures in TCP and SCTP protocols impose the burden of unnecessary communication processing on applications running on low error-rate networks (such as High Performance Computing (HPC) and data center clusters) as well as applications which do not require reliability.

Moreover, the complexities and overhead associated with packet marking, which is required to adapt the message-oriented iWARP stack over the stream-oriented TCP protocol, further reduce the overall message rate that can be achieved with the current TCP-based iWARP standard.

Clearly, there is a need for a method and system for implementing unreliable RDMA over datagrams.

SUMMARY

A communication stack for providing remote direct memory access (RDMA) over a datagram network is disclosed. The communication stack has a user level interface configured to accept datagram related input and communicate with an RDMA enabled network interface card (NIC) via an NIC driver. The communication stack also has an RDMA protocol layer configured to supply one or more data transfer primitives for the datagram related input of the user level. The communication stack further has a direct data placement (DDP) layer configured to transfer the datagram related input from a user storage to a transport layer based on the one or more data transfer primitives by way of a lower layer protocol (LLP) over the datagram network.

A communication system is also disclosed. The communication system has a datagram network, source network circuitry, and target network circuitry coupled to the source network circuitry via the datagram network. The source network circuitry is configured to 1) supply one or more data transfer primitives for a datagram related input from a user level application; and 2) transfer the datagram related input from a source storage to a transport layer based on the one or more data transfer primitives by way of a lower layer protocol (LLP) over the datagram network. The target network circuitry is configured to receive the datagram related input from the transport layer based on the one or more data transfer primitives by way of the LLP over the datagram network.

Circuitry for providing remote direct memory access (RDMA) over a datagram network is further disclosed. The circuitry has an RDMA enabled network interface card (NIC). The circuitry also has a user level interface configured to accept datagram related input and communicate with the RDMA enabled NIC. The circuitry further has an RDMA protocol layer configured to supply one or more data transfer primitives for the datagram related input of the user level interface. The circuitry also has a direct data placement (DDP) layer configured to transfer the datagram related input from a user storage to a transport layer based on the one or more data transfer primitives by way of a lower layer protocol (LLP) over the datagram network.

A method for providing remote direct memory access (RDMA) over a datagram network is also disclosed. A datagram related input is accepted via a user level interface. Using an RDMA enabled network interface card (NIC), one or more data transfer primitives are supplied for the accepted datagram related input. The datagram related input is transferred to a transport layer based on the one or more data transfer primitives by way of a lower layer protocol (LLP) as one or more messages over the datagram network without an adaptation layer to put boundaries on the messages.

It is at least one goal of the claimed invention to provide an improved method for remote direct memory access over datagrams.

Figure 1:
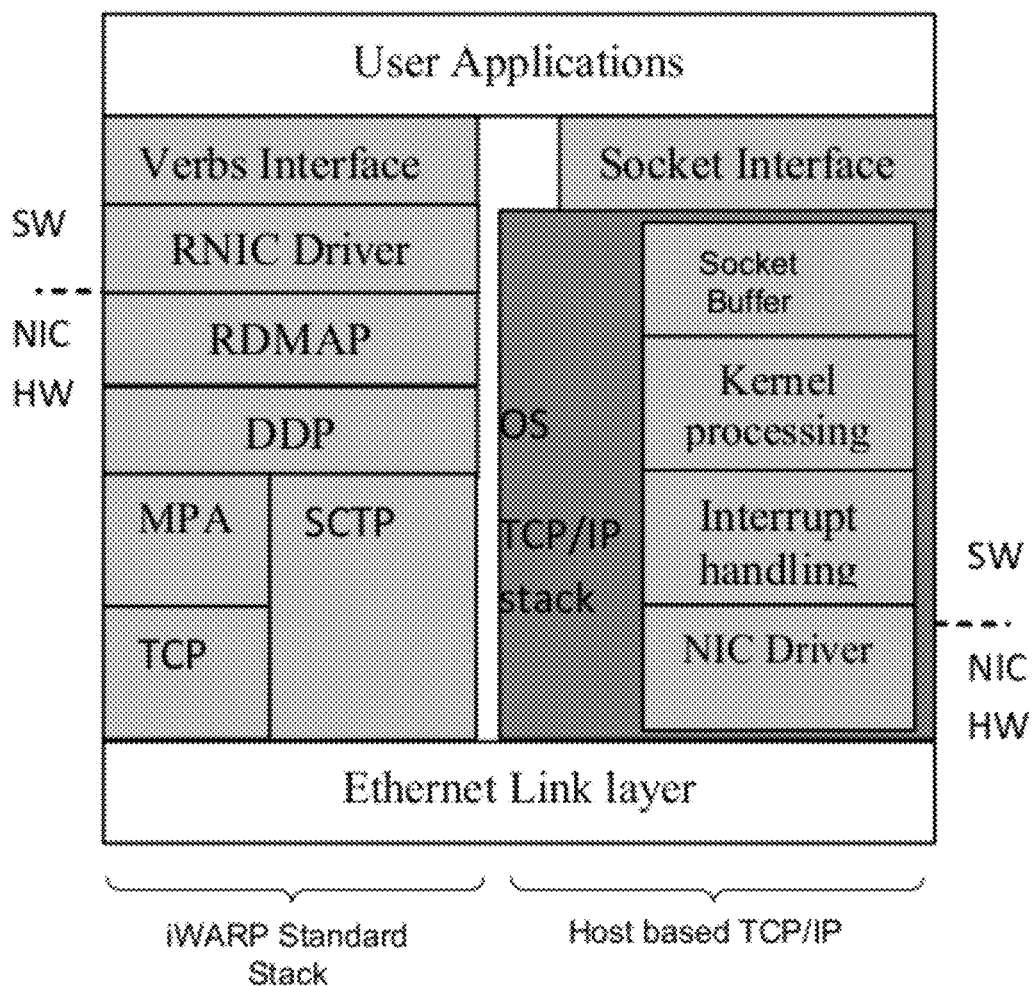
FIG. 1 schematically illustrates an iWARP standard stack compared to host-based TCP/IP.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

The area of direct data transfer from a network interface of a given computer (source) to the target user buffer memory space of another computer (target) is commonly known as Remote Direct Memory Access (RDMA). The current state of the art in RDMA is shown in InfiniBand networks and iWARP Ethernet Adapters.

There are two models for zero-copy communication in use, the send/recv model, and the write/read model. In the send/recv model the source computer determines the area in its local memory to be sent to the target machine. The target machine indicates where the incoming data is to be placed in its local memory, and upon receipt of the data from the source computer, it matches the incoming data to the desired location in memory. This creates a matching between the send request from the source machine and a receive request from the target machine. This is therefore a two-sided communication as both sender and receiver are actively involved in the process. Both the send/recv and write/read models require that both the source machine's memory and the target machine's memory be registered prior to any data exchange. However, in the write/read model, the information on the target's registered memory must be known at the sender side in order to properly form a message for transmission to the target's memory. This means that all information required to transfer data in the sender's local memory to a target's memory is available at the sender side. Therefore, this is a one-sided communication model. The sender can reference local memory and transfer it to the target machine's memory along with information about where the data is to be placed in the target machine's memory.

The state of the art relies on an underlying assumption that a one-sided RDMA operation is reliably performed when requested, regardless of the underlying network transports. Therefore, one-sided RDMA is only operable over networks that are either reliable, or have a layer within the networking stack that provides reliability. The present invention is designed to provide an unreliable RDMA operation over an unreliable network. By "unreliable RDMA operation", we do not mean that the method does not work. Rather, this means that the RDMA operation may not occur properly (reliably) at times because the underlying transport may be itself unreliable. Accounting for the unreliability of an RDMA operation requires methods of determining at the receiver's side what valid memory operations have taken place, which are not available in the current state of the art designs.

Accordingly, prior art only supports out-of-order requests over reliable RDMA operations. The development of reliable one-sided RDMA over an unreliable datagram network using the Low-level Application Programming Interface (LAPI) over an IBM Scalable Powerparallel (SP) supercomputer Switch network is an example of such prior art. The present invention provides unreliable RDMA operation support over an unreliable network, and handles out-of-order requests.

Prior art also provides that both the send/recv and write/read models must be reliable when operating over an Ethernet network. Ethernet networks allow reordering to take place and can result in dropped data packets. Therefore, reliability is required in an Ethernet network solution as the assumption is still present that RDMA operations are themselves reliable. The required overhead in ensuring reliability of the network layer is potentially too onerous for some applications. To provide reliability, the current state of the art requires that some state information concerning the in-progress data transfer must be kept, and retransmissions must be made for lost data. In addition, data must be ordered at the receiver in the order in which it was sent from the source machine. This ordering must be accomplished by buffering incoming data or dropping packets that are out of order, requiring their retransmission. In order to provide better performance for applications which do not require reliable reception of all of the data transmitted to them, we must remove this requirement. The present invention can provide both send/recv and write/read models over an Ethernet network, as an unreliable RDMA operation. As such, it is capable of working over unreliable transports, such as the User Datagram Protocol (UDP).

In the embodiments disclosed herein, and their equivalents, we keep the current well-developed specification of iWARP, while extending its functionality to support datagram traffic. In the first step, we highlight parts of the standard at different layers that are incompatible with datagram semantics. Then we provide novel system and method embodiments to address such incompatibilities. Based on the disclosure herein, other embodiments will be apparent to those skilled in the art, and all such equivalents are intended to be covered by the appended claims.

Figure 2:
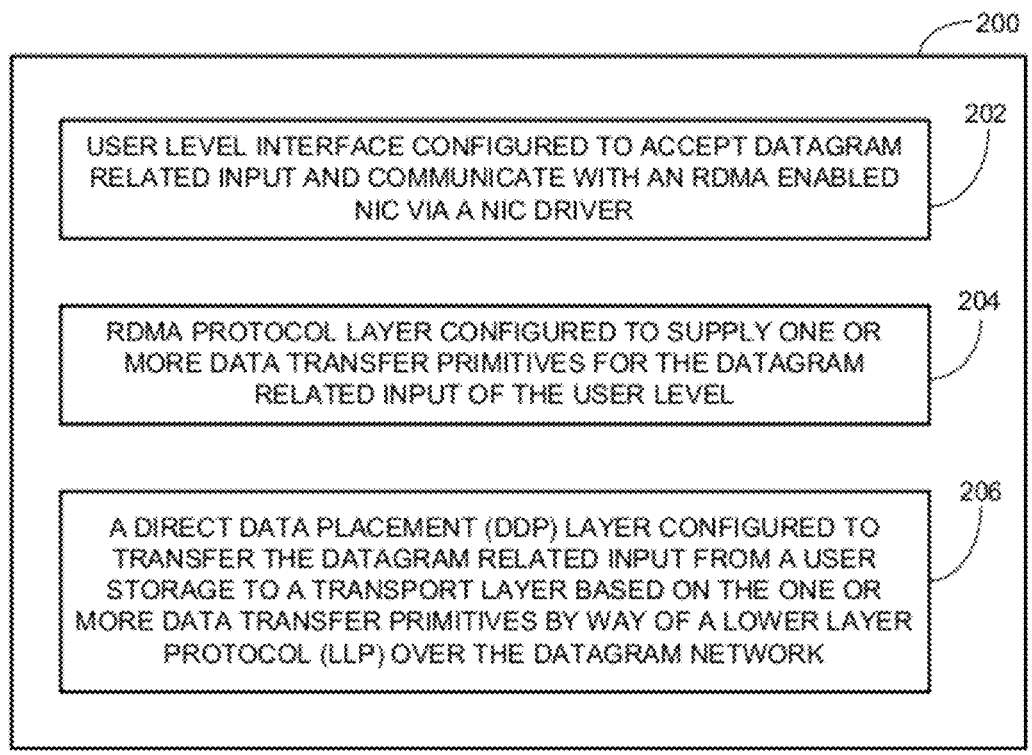
FIG. 2 schematically illustrates one embodiment of a communication stack for providing remote direct memory access (RDMA) over a datagram network.

FIG. 2 schematically illustrates one embodiment of a communication stack 200 for providing remote direct memory access (RDMA) over a datagram network. The communication stack 200 has a user level interface 202 configured to accept datagram related input and communicate with an RDMA enabled NIC via a NIC driver. The user level interface may include verbs and data structures to accept datagrams. Depending on the embodiment, the introduction of new verbs is not necessarily required for the datagram mode. For example, in the case of embodiments using iWARP, the existing set of iWARP verbs can be adapted to accept datagram related input and act according to the datagram service. The communication stack 200 also has an RDMA protocol layer 204. The RDMA protocol layer 204 may be configured to supply one or more data transfer primitives for the datagram related input of the user level. Data transfer primitives for the datagram related input of the user level interface may include one or more work requests (WRs) in a queue pair (QP) data structure.

Depending on the embodiment, there are some parts of the verbs specification that could be changed to support datagram transport. For example, currently, there is only one type of queue pair (QP), the connection-based QP. Thus, there has been no need for QP type definition. With the new extension, new QP type(s) may be added to distinguish datagram-iWARP from connection-based iWARP. More details will be discussed below.

QP creation and its input modifiers may also be changed. For example, to specify the transport type (connected or datagram) a new input modifier could be added to the QP attribute structure. Specification of the QP modify verb may also need to change, to accommodate the new definition of the QP states and the required input data for datagram QPs. As an example, the datagram QPs might need a pre-established datagram socket to be passed to modify the QP into the Ready To Send (RTS) state.

An address handle is required for each send WR posted to the datagram QP to specify the receiver's IP address and UDP port related to the remote QP. Completion notifications structure needs to be changed to accommodate the new WR structure. In particular, the work completion structure should be changed to include the source address. The communication stack 200 also includes a direct data placement (DDP) layer 206 configured to transfer the datagram related input from a user storage to a transport layer based on the one or more data transfer primitives by way of a lower layer protocol (LLP) over the datagram network.

Reliable, In-Order Delivery

Reliable service is a fundamental assumption in the current iWARP standard. This assumption is not necessarily in opposition to the use of datagrams. In datagram-iWARP design we introduce two types of datagram services, Unreliable Datagram (UD) and Reliable Datagram (RD). Subsequently QP types need to be defined at the verbs and RDMAP layers. The defined QP types are: Unreliable Datagram (UD) and Reliable Datagram (RD) for UDP and Reliable Connection (RC) for the current TCP-based QPs.

The datagram-iWARP over UD transport assumes no reliability or order of delivery from the LLP. In the untagged embodiments, the incoming messages will be matched to the posted receive WRs at the data sink, in order of their arrival at the DDP layer which is not necessarily their order of issue at the data source. While keeping the iWARP data integrity checksum mechanism (e.g. CRC), the rest of reliability measures are left to the application protocol. For the tagged embodiments, it is assumed there is no receiver side matching at the iWARP level, due to the one-sided nature of the operations. Such a service is very useful for applications with high error resiliency (such as media streaming applications in datacenters) and applications that can efficiently provide their own required level of reliability. An example can be the applications running in low error rate environments such as closed Local or System Area Networks where standard reliability measures impose too much performance overhead.

For the RD service, the LLP is assumed to guarantee that messages from a specific data source are delivered correctly and in-order. Such a definition implies a logical pseudo-stream between the local QP and the remote QP. However, DDP/RDMAP layers are not required to keep state information for such a logical stream. Similar to UD, DDP and RDMAP for RD service are required to pass the messages in the order they have received them. To keep the scalability advantages of using a connection-less transport, the LLP reliability service is assumed in some embodiments to be lightweight and should require no or minimal buffering for individual remote sockets.

Streams and Connections.

The RDMAP and DDP layer streams are assigned to underlying LLP connections that are assumed to be pre-established. Since connections are conceptually not supported in a datagram (connection-less) model, no connection establishment and teardown is required. For datagram-iWARP, a previously created UDP socket is required for each QP. In this case, the upper layer protocol (ULP) transitions the QP into iWARP mode after creating the QP and assigning the lower layer socket. This operation is done locally without negotiating any parameters (such as CRC settings) with any other peer. Such parameters need to be pre-negotiated by the ULP. This also implies that the ULP is no longer required to configure both sides for iWARP at the same time.

Transport error management and connection teardown/termination requirements in the current standard will be the responsibility of the datagram LLP, if a reliable service is being used (i.e. RD mode). Error management at the higher layers (e.g. DDP or RDMAP) may be modified to suit the datagram service. For example, the current standard requires an abortive termination of a stream at all layers and an abortive error must be surfaced to the ULP, should an error be detected at the RDMAP layer for that stream. Since such a requirement does not apply to datagrams for UD service, an abortive error must be surfaced to the ULP and the QP must simply go into the Error state without requiring any stream termination. This makes the QP unable to communicate with any other pair, until the QP is reset and modified to the RTS state by the application. Instead of the stream termination message sent to the other side, a simple error message should be transferred, identifying the erroneous message number using the Message Sequence Number (MSN in the DDP header). The error message can be placed into an Error queue that replaces the Terminate queue of the connected mode. For some embodiments of UD service, we don't invalidate LLP sockets (or QPs). When errors occur due to data loss, they are simply reported, but the QP is not forced into an error state. For other embodiments of UD service, the method can still function without sending an error message back to the source.

QP Identification

For the untagged model, the DDP layer may provide a queue number (QN) in the DDP header to identify the destination QP. The prior art RDMAP only uses its first 2 bits of the DDP header, so there is room for identification of the QN. In some embodiments of the datagram-iWARP, we currently assume assignment of a single datagram QP to a UDP socket. In such a model, no QN is required to identify the source and destination QPs. An optional model of the datagram service can assign multiple datagram QPs to a single socket, similar to multiple streams per LLP connection in the current iWARP. Such a case can benefit from the QN field in the DDP header.

Message Segmentation

Unlike TCP byte-oriented service, UDP datagrams will arrive at the LLP in their entirety and thus the concept of message segmentation and out-of-order placement at the DDP layer is irrelevant to the datagram service. This implies that the DDP layer does not need its provisions for segmented message arrival over the datagram transport (including message offset (MO) and even MSN for some cases). For messages larger than maximum datagram size (64 KB), segmentation at the application layer is highly recommended, although not absolutely required.

Completion of Work Requests (WRs)

In the connected mode, a WR is considered complete when the LLP layer can guarantee its reliable delivery. The same semantics can be used for RD transport. However, for the UD transport we no longer require an LLP guarantee. Thus, a WR should be considered complete as soon as it is accepted by the LLP for delivery.

Marker PDU Alignment (MPA) Layer.

Since each DDP message will be encapsulated into one UDP datagram, no markers are required for iWARP over UDP. Therefore, the MPA layer (specifically the marker functionality) is not needed for the datagram service. This will improve the performance of the datagram transport since MPA processing has shown to impose significant overhead on the performance of iWARP due to marker placement complexities, in addition to increasing the overall size of the required data transmission.

Software Implementation

Figure 3:
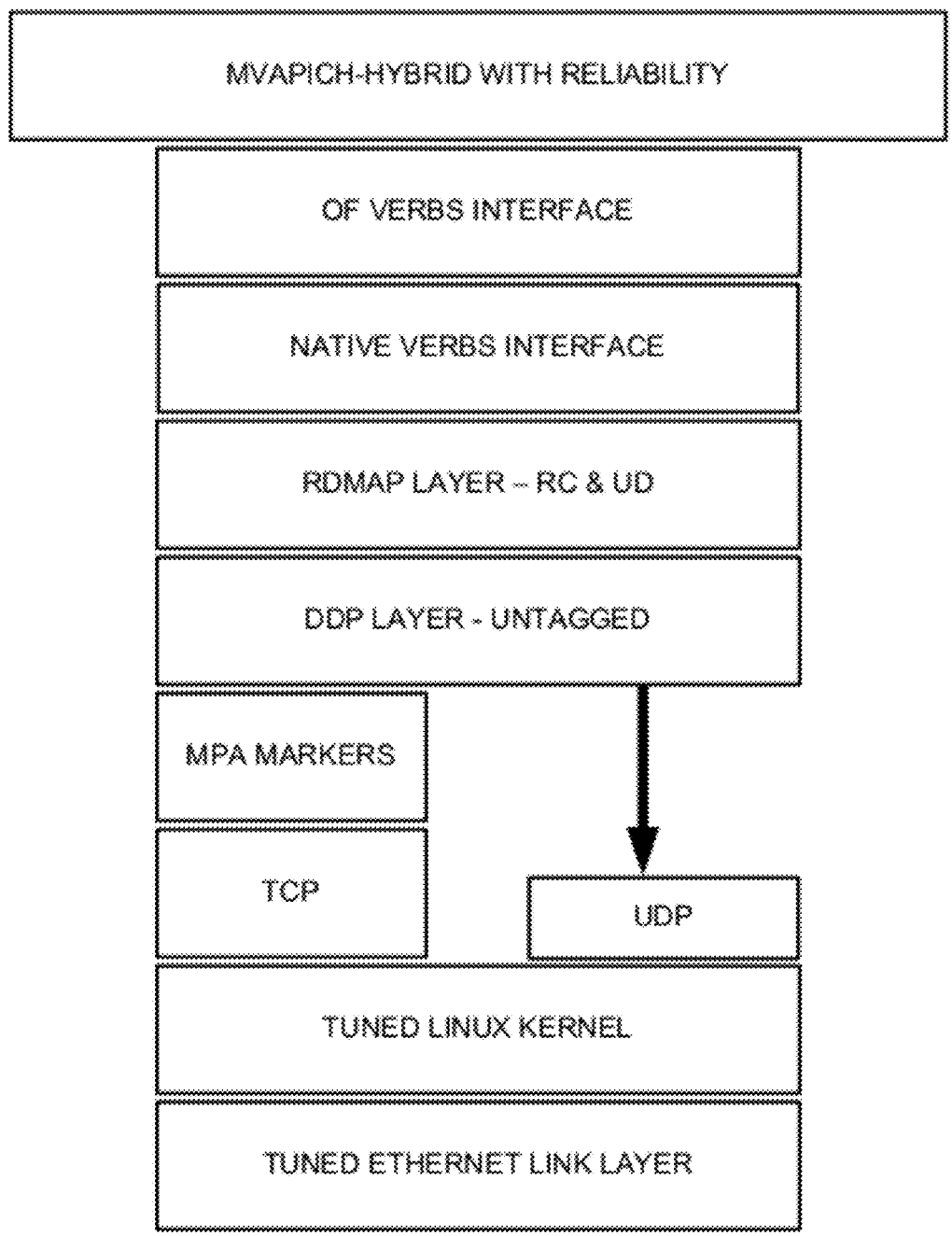
FIG. 3 schematically illustrates the layered stack of a software implementation of datagram-iWARP which is built on top of an available software-based iWARP code

To evaluate the proposed datagram extension to the iWARP standard we have developed a software implementation of datagram-iWARP. It should be understood that other embodiments are not limited to iWARP and may be used with other types of unreliable datagram networks as well as non-stream based reliable datagram networks. FIG. 3 shows the layered stack of this implementation which is built on top of an available software-based iWARP code from Ohio Supercomputer Center (OSC). For embodiments which utilize iWARP, other sources of iWARP code may be used as well. Our implementation can be used on top of both reliable and unreliable UDP protocols.

Below, we present an evaluation of an embodiment built on top of unreliable (regular) UDP. To assess our implementation in a standard way, we have completed an OpenFabrics (OF) verbs interface on top of the native software iWARP verbs. We have also used the OF verbs interface to adapt an existing MPI implementation on top of our iWARP stack. The next subsections discuss some features of our implementation at both iWARP and MPI levels.

Software Datagram-iWARP

As mentioned above, we have used the OSC SW-iWARP implementation as our code base and extended that code in the datagram domain. Here we list a number of features for our implementation:

Complete implementation and integration of iWARP over UDP, into the TCP-based iWARP stack from OSC. This has been done by introducing new native verbs to support datagram semantics.

Using CRC at the lower DDP layer for datagrams.

Using a round-robin polling method on operating sockets, to ensure a fair service to all QPs in the software RNIC.

Using I/O vectors for UDP communication (similar to TCP) to avoid extra sender and receiver side copies, for improved performance and CPU availability. In I/O vector calls (sendmsg and recvmsg), message data and header can be gathered/scattered from/to non-contiguous data to/from the datagram. Therefore an intermediate copy is not required to make the UDP datagram.

Avoiding segmentation of DDP messages into MTU-size datagrams. This option, which is possible due to message-oriented nature of UDP, positively contributes to the performance of datagram-iWARP.

Implementation of standard OF verbs: These verbs were originally designed for InfiniBand (called OpenIB verbs). Currently they are known as OF verbs and are utilized to implement iWARP verbs abstraction as well. We use the native verbs to implement the OF verbs utilized at the MPI layer.

MPI Over Datagram-iWARP

To evaluate the performance and memory usage of a datagram based iWARP for HPC applications, we have adapted MVAPICH (Open source MPI software available from Ohio State University at http://mvapich.cse.ohio-state.edu) on top of OF verbs over software iWARP. We have used the hybrid channel from the MVAPICH-Aptus over InfiniBand.

MVAPICH-Aptus is an available MPI implementation that offers a hybrid (UD and RC) channel over OF verbs. The hybrid channel offers a dynamic channel management over InfiniBand's UD and RC transports, meant to offer scalability for MPI applications on large scale InfiniBand clusters. The channel starts with UD-based QPs for each process, and based on a set of policies, establishes RC connections to a selected set of other processes, up to a maximum number of RC QPs. This strategy makes applications scale better by limiting the resource-greedy RC connections and putting most of the communication on UD QPs. Reliability was added for UD communication at the MPI layer, using acknowledgments and timeouts.

The MVAPICH code was modified in several ways to adapt it over the iWARP standard and our software implementation. Here is a list of some modifications made to the implementation:

Transforming MVAPICH UD-based connection management to the datagram-iWARP: This includes establishing datagram sockets and relevant address handles to be used as the underlying LLP (UDP) sockets required by datagram-iWARP.

Transforming MVAPICH InfiniBand RC-based connection management: The MVAPICH hybrid channel uses on-demand RC connection management. Due to semantics differences between TCP and InfiniBand RC, the handshaking steps for MVAPICH dynamic connection establishment have been modified. The new arrangement also piggybacks some new required information and in addition, performs the socket connections at the very last handshake stage.

Changing or disabling parts of the code relying on incompatibilities between iWARP and InfiniBand. This includes functions unsupported in the iWARP implementation such as immediate data, the DDP tagged model, GRH headers, Shared Receive Queues (SRQ), eXtended Reliable Connections (XRC), Service Levels (SL), LIDs and LID mask control Experimental Platform We used two clusters for our experiments. Cluster C1 is a set of four nodes, each with two quad-core 2 GHz AMD Opteron processors, 8 GB RAM and a NetEffect 10-Gigabit Ethernet (10 GE) card connected through a Fujitsu 10 GE switch. The OS is Fedora 12 (kernel 2.6.31). Cluster C2 contains 16 nodes, each with two dual-core 2.8 GHz Opteron processors, 4 GB RAM and a Myricom 10 GE adapter connected to a Fulcrum 10 GE switch. The OS is Ubuntu with kernel version 2.6.27.

Experimental Results and Analysis

Figure 4A:
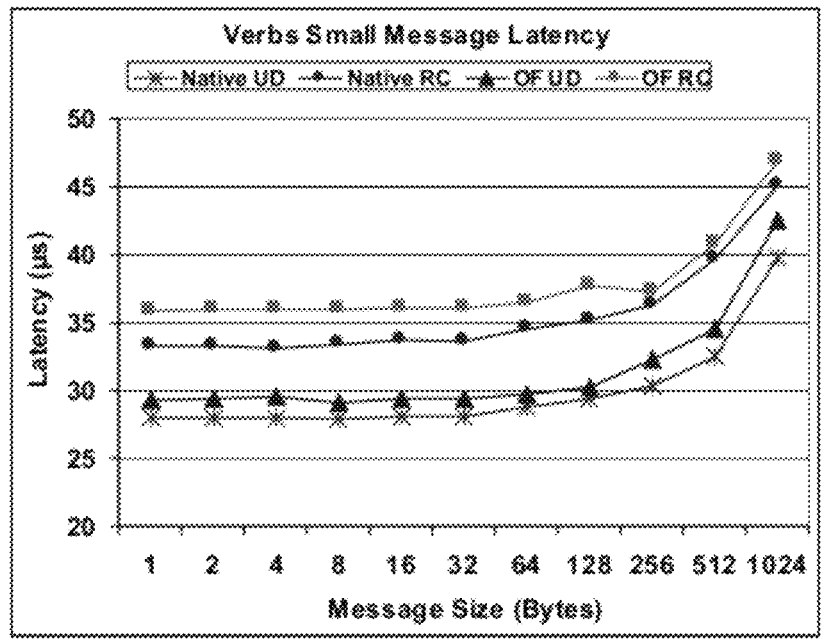
FIGS. 4A-4C show the verbs layer ping-pong latency results for small, medium and large message latency respectively.
Figure 4B:
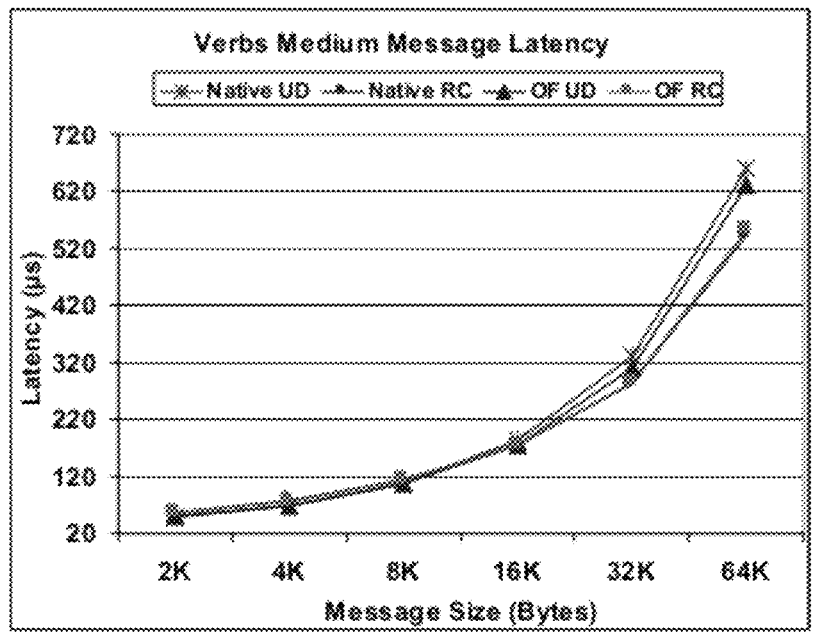
Figure 4C:
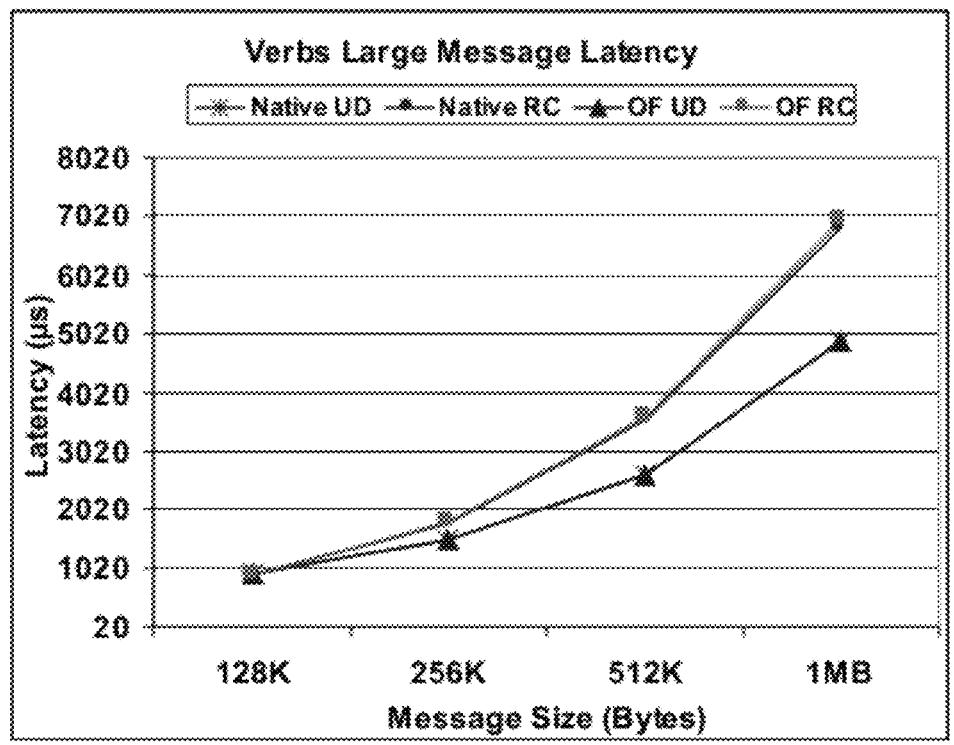

We use microbenchmarks to test the performance of the UDP-based iWARP compared to that of the standard TCP-based iWARP. At the verbs layer, we present latency results for both native verbs and OF verbs on top of them. FIGS. 4A-4C show the verbs layer ping-pong latency results for small, medium and large message latency respectively. We clearly observe that in most cases the UD latency is lower than that of the RC, primarily due to the following reasons:

Communication over UDP offers a lighter and consequently faster network processing path.

UD path is bypassing the MPA layer markers, while RC-based messages require markers, which are a significant source of overhead on all message sizes.

The closed dedicated cluster provides an almost error-free environment where strict reliability measures of the TCP protocol are considered purely overhead compared to the unreliable UDP.

The reason for UD latency being significantly more than RC latency at 64 KB is that it is exceeding the maximum datagram size and the benchmark needs to split the messages into 64 KB chunks. The plots in FIG. 4 also show a small overhead for the OF verbs implementation on top of the native verbs.

Figure 5A:
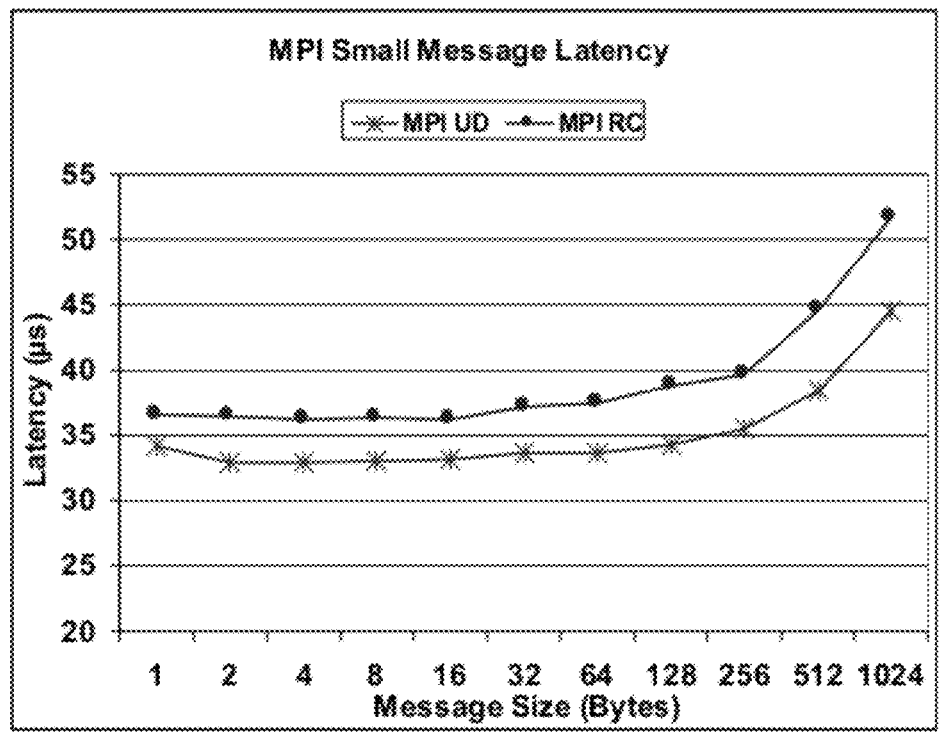
FIGS. 5A-5C include the ping-pong latency comparison of Message Passing Interface (MPI) over datagram and connection based iWARP.
Figure 5B:
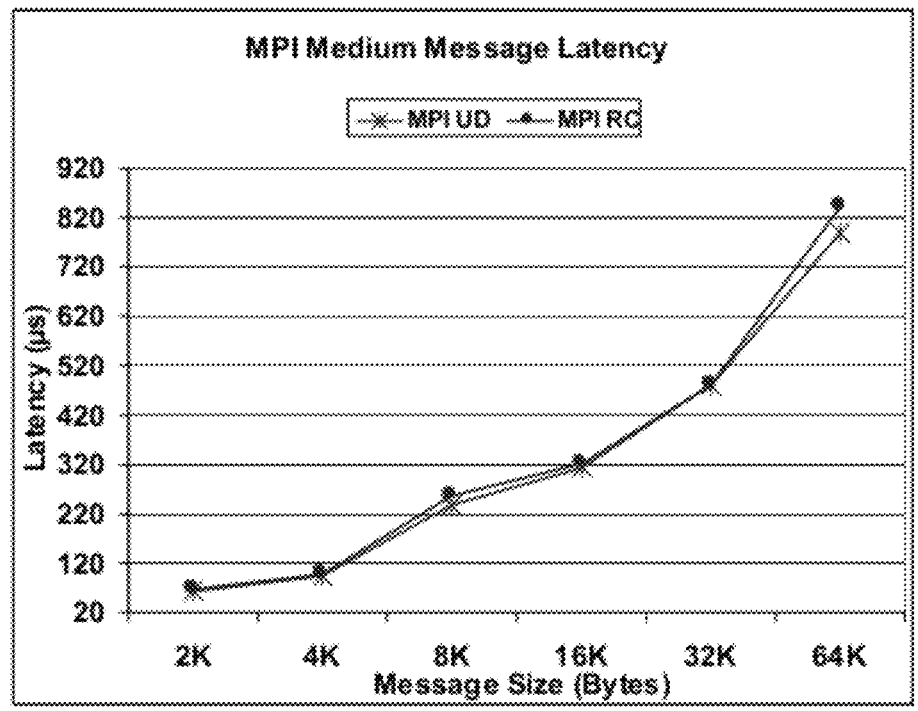
Figure 5C:
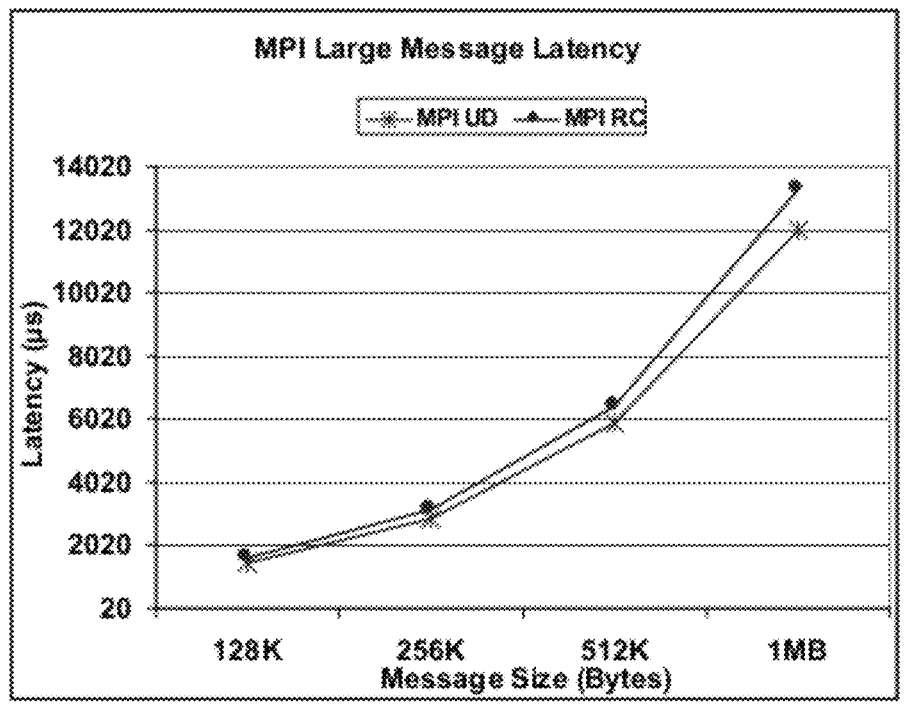

At the MPI layer, we present microbenchmark results for latency and bandwidth. For all datagram tests we use the MPI level reliability provisions that exist in MVAPICH code for the UD transport. FIGS. 5A-5C include the ping-pong latency comparison of MPI over datagram and connection based iWARP. Results show the superiority of UD-based MPI performance over RC mode, which is mainly carried from the verbs performance benefits.

Figure 6:
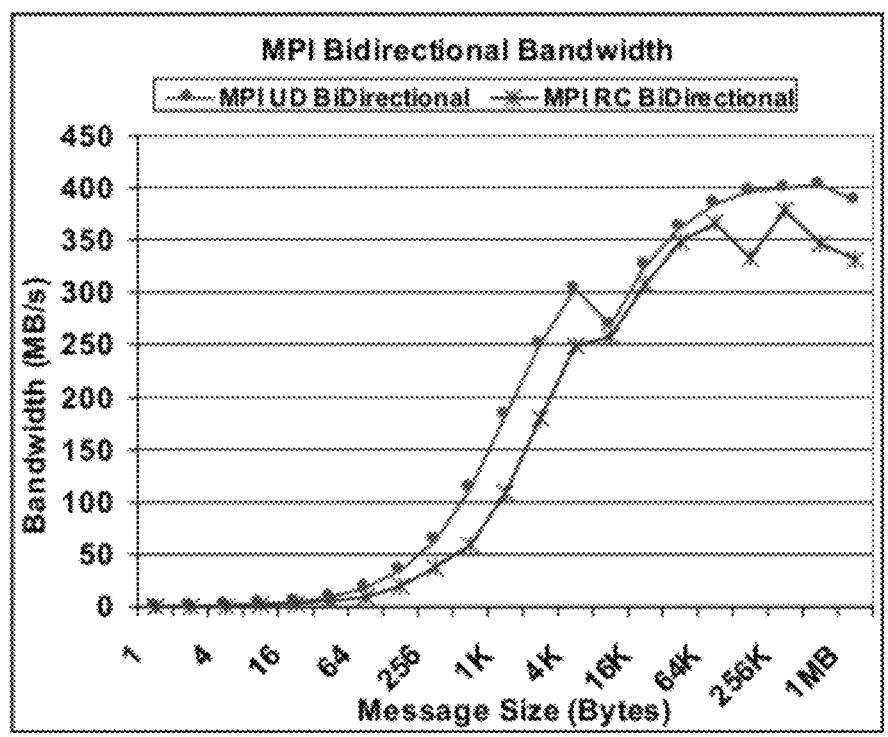
FIG. 6 shows bidirectional bandwidth results at the MPI level.

FIG. 6 shows the bidirectional bandwidth results at the MPI level. For this test, we use two pairs of processes on two nodes, communicating in the opposite directions. In each pair, one of the processes posts a window of non-blocking receive calls. The other process in the pair posts a window of non-blocking send calls. Synchronization then occurs at the end.

As observed, MPI-UD offers a higher bidirectional bandwidth for most of the message sizes, meaning that we can better saturate the network using datagrams. Lighter protocol processing and minimal reliability measures are the advantages of UD-based communication that make the benchmark capable of pushing more data on the wire in each direction.

MPI Application Results

Figure 7A:
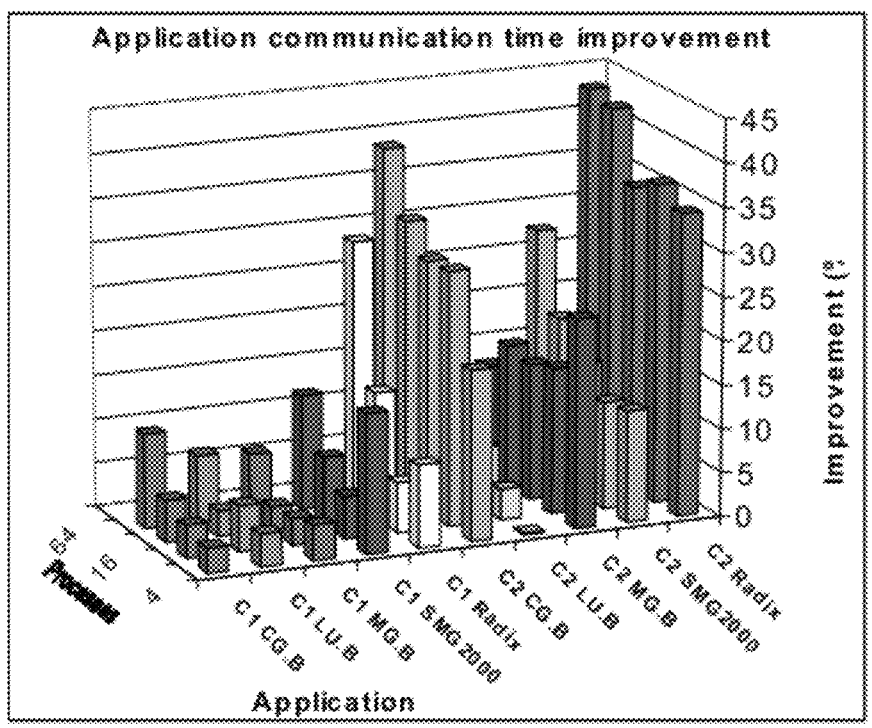
FIGS. 7A-7B present MPI application performance results, including total communication time and application runtime.
Figure 7B:
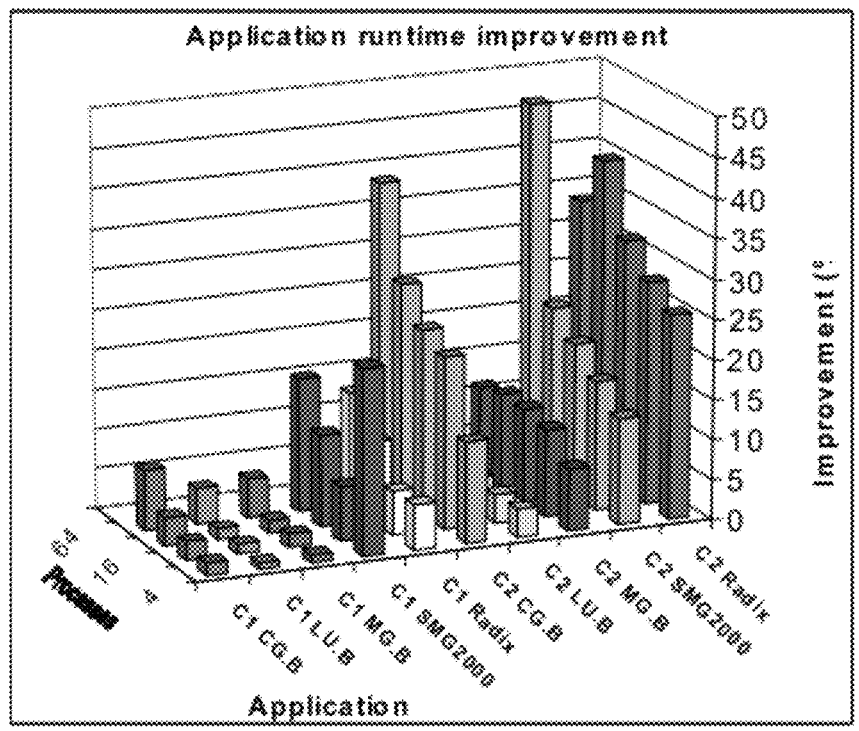

FIGS. 7A-7B present MPI application performance results, including total communication time and application runtime. For measuring communication time we aggregate the time spent in communication primitives: MPI blocking and non-blocking send and receive and MPI wait calls.

The results are reported for class B of CG, MG and LU benchmarks from NAS parallel benchmark (NPB) suit version 2.4, as well as Radix and SMG2000 applications. All results are presented for 4, 8, 16, 32 and 64 processes (64-processes only on C2 cluster).

The results for both communication time and application runtime clearly show that we can expect considerable performance benefits when using datagram communication. In addition to reasons for superiority of datagram-based communication discussed above, the lowered complexity of UDP should theoretically create the availability of more CPU cycles for applications' computation phases, which would lead to lower overall runtimes.

Application Memory Usage

One of the strongest motivations to extend iWARP standard to datagram domain is to improve its memory usage in order to make it scalable for large scale parallel jobs. At the MPI layer, MVAPICH pre-allocates a number of general buffer pools with different sizes for each process. For the datagram QP that is established in both connection and datagram based modes, a number of buffers are picked from these pools and pre-posted as receive buffers to the QP. Once a new connection-based QP is established, a default number of 95 receive buffers are picked from the pools and posted to the QP. With a default size of 8 KB for each buffer, a rough estimate of 800 KB or 200 pages of 4 KB size are required per connection for each process.

Figure 8:
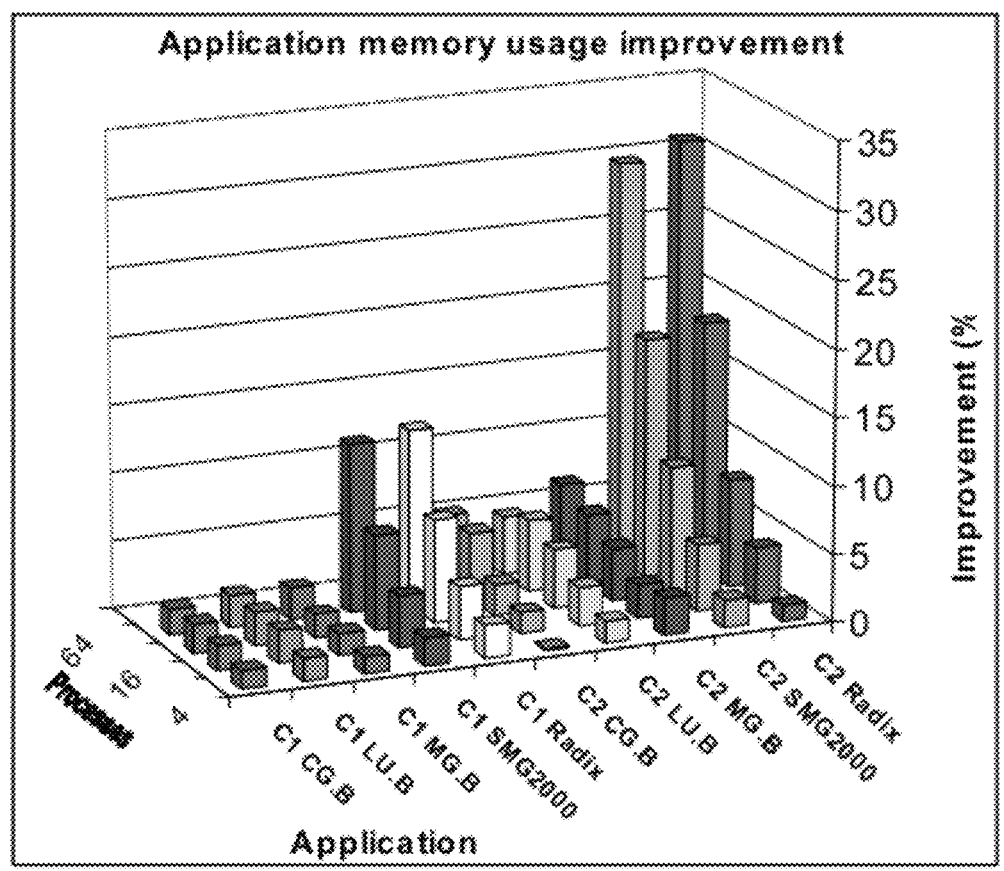
FIG. 8 shows the improvement percentage for datagram-iWARP over connection-oriented iWARP.

To measure the memory usage for the software-based iWARP, we use the total number of memory pages allocated to each MPI job in Linux, reported by the Linux proc filesystem. FIG. 8 shows the improvement percentage for datagram-iWARP over connection-oriented iWARP. As observed, the overall memory usage of MPI applications can benefit from using datagrams. The benefit for some applications in NPB (such as CG) are relatively low and do not scale very well with the number of processes. This is primarily because each process in such applications usually communicates with a few partners. Therefore, the number of connections for each process will not scale exponentially with the number of job processes. This means that the memory benefit can decrease or stay at the same level (the results are correspondingly better for the C2 cluster due to greater inter-node communication). This is however not the case for SMG2000 and Radix. In these applications a process may communicate with all of the other processes, and therefore the number of dynamically allocated connections will increase exponentially with the number of processes in the job. This is why we see significant increase in memory saving when the scale of the MPI job increases.

An observation in both performance and memory usage benchmarks is that the C2 cluster results are significantly better than that of the C1 cluster. Obviously, with the same number of processes, the inter-node communication between the nodes is quadrupled in C2. This also translates in more inter-process connections, which implies more memory savings on C2. The results lead to this conclusion that when the amount of inter-node communication rises, so do the benefits of using datagram-iWARP.

Figure 9:
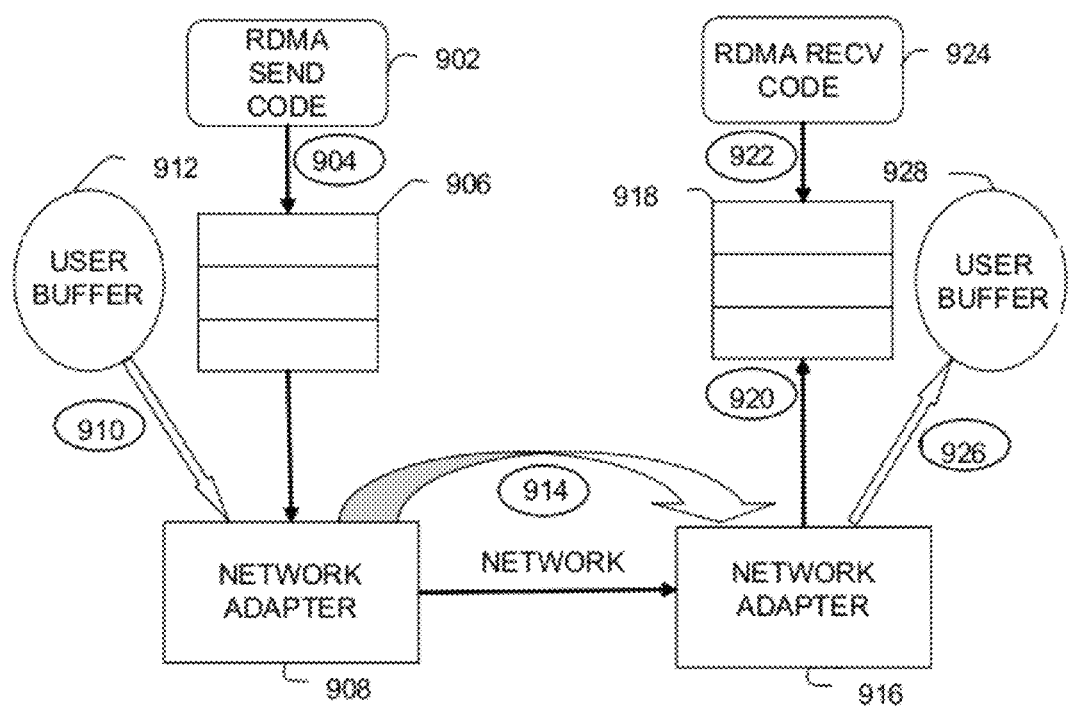
FIG. 9 is a diagram of the overall function of a two-sided send/recv model.

Models Enabled by the One or More Data Transfer Primitives:

FIG. 9 is a diagram of the overall function of a two-sided send/recv model where a computer code 902 calls a send function 904. This places a send request in the request queue 906 of the network adapter 908. This request is fulfilled by the adapter when it fetches the data 910 from the local memory 912 and transfers the data over the network 914 to the target machine's network adapter 916. Upon receipt at the target machine, the target machine's request queue 918 is checked 920 for an entry matching the incoming data, and providing a location in the target's machines local memory where the data is to be written. This recv entry in the target machine's queue 918 must occur before the data arrives at the target machine's network adapter. This is expected to be done 922 by some RDMA recv code 924 on the target machine. Finally if there is a matching entry in the target machine's work queue 918, the data in the recv entry is used to write 926 the data from the sending machine to the target machine's local memory 928.

Figure 10:
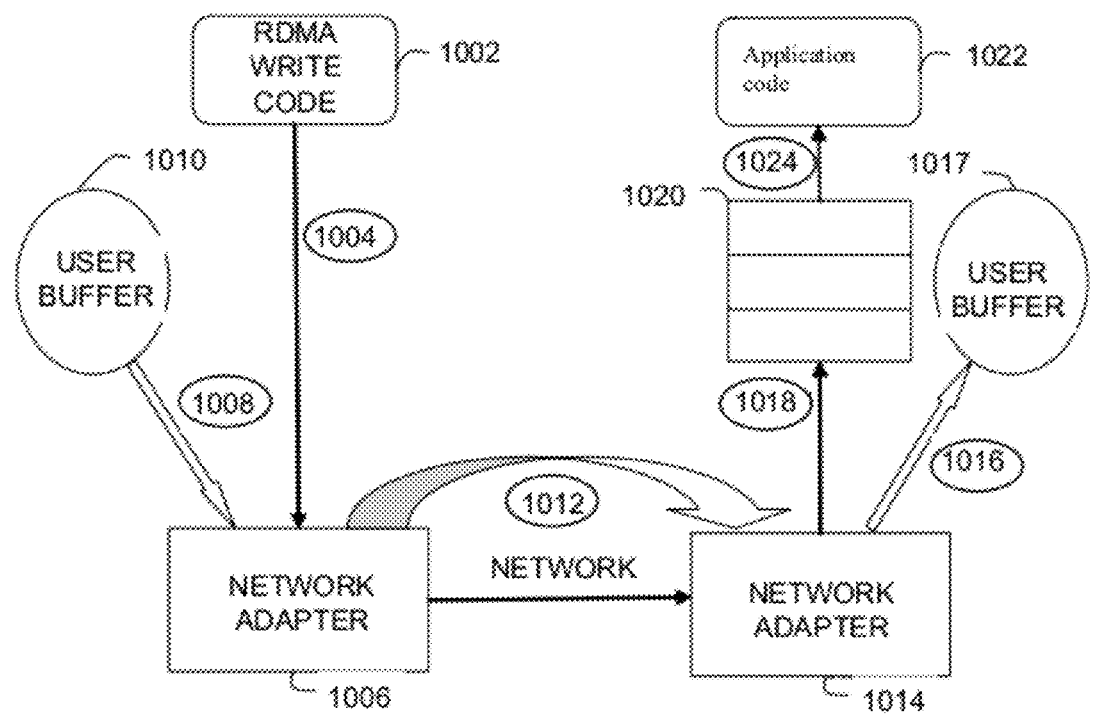
FIG. 10 is a diagram of the function of the one-sided RDMA Write model.

FIG. 10 is a diagram of the function of the one-sided RDMA Write model. To initiate the transfer of data some computer application code 1002 calls an RDMA Write function. This causes 1004 the network adapter 1006 to fetch the appropriate data 1008 from the source machine's local memory 1010, and determines where it is to be written into the target machine's local memory, and sends it to the target machine over the network 1012. When the data is received by the target machine's network adapter 1014 it is written 1016 into the target machine's local memory 1017 to the location indicated by the source machine's instructions. Once the data is written, a record of the write is entered 1018 into a data structure 1020 that can consist of a completion type record with information on both the event happening and where and how large the data written to memory was. Alternatively, this data structure 1020 could exist as a validity map, a structure indicating only the areas of local memory which have been written to successfully. An application 1022 running on the target node is then capable of determining the validity of memory by consulting 1024 the validity map 1020 or completion queue.

Operating Conditions:

Datagram-iWARP preferably uses Cyclic Redundancy Check (CRC32) when sending messages. In addition, there is no initial set up of operating conditions exchanged when the QP is created; the operation conditions are set locally, and should be communicated through the ULPs. Given that we are using an unreliable transport, using messages spanning multiple datagrams makes the system vulnerable to packet loss. While useful in conditions of low network congestion, it can cause significant problems based on the existing standard. With datagram-iWARP it is recommended that the application layer perform segmentation and assembly for messages larger than the defined maximum UDP packet size, 64 KB. Although for UD RDMA operations it is possible to perform reassembly of larger messages in the iWARP stack.

RDMA Write Over Datagrams

For datagram-iWARP, using a reliability scheme at the lower layers cannot be assumed, so we can be assured of neither reception nor in-order guarantees. Therefore, it is desirable to have an operation that can determine the validity of data on the target side without a supporting operation generated at the source side.

Currently, RDMA Write over reliable connections can notify the target application of when data are valid by completing a send/recv operation after the successful RDMA Write. This has the purpose of informing the application that there is valid data to read. Alternatively, some implementations also use a flagged bit in memory that is polled upon, and when set, the operation is known to be complete. Over an unreliable transport this does not work for several reasons. Firstly, the RDMA write may not complete successfully, and the send/recv operation does, which causes the target to receive invalid data (as the source considers the write operation complete when all data have been passed to the LLP). Alternatively, the RDMA operation may complete but the send/recv is lost. Using high-level acknowledgments is not an ideal solution to these problems as such acknowledgements may also be lost and cause unnecessary re-transmission.

RDMA Write-Record

Figure 11:
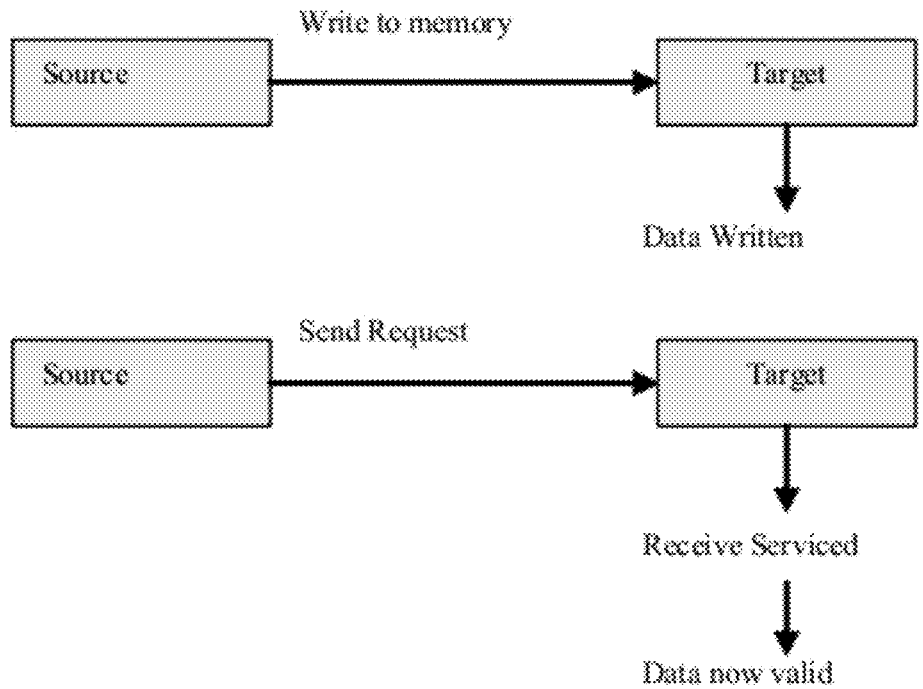
FIG. 11 illustrates a regular RDMA-Write (one-sided, as discussed with regard to FIG. 10) and a two-sided RDMA-Send (as discussed with regard to FIG. 9)
Figure 12:
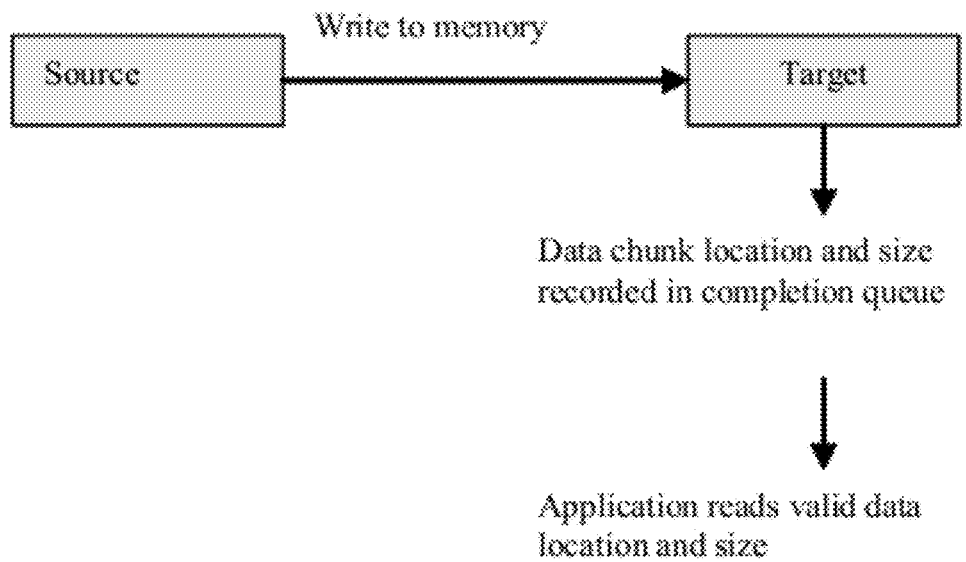
FIG. 12 illustrates a one-sided RDMA write-record operation.

We propose a new method RDMA Write-Record for use over unreliable datagrams. RDMA Write-Record must log at the target side what data have been written to memory and is valid. The target application can then request this information to determine what data are valid by reading the appropriate completion queue entries. These completion queue entries can be designed as either individual entries for each logical chunk of data in a message or can be a validity map, essentially an aggregated form of individual completion notifications. For messages of a size less than or equal to the Maximum Transfer Unit (MTU) of the LLP, this notification is very simple, comprising only a single completion entry or single entry validity map. This method differs from send/recv over UD as there is no matching receive request posted, the data are simply placed in the correct memory location. However, unlike a traditional RC RDMA Write operation, no further communication is required between the source and target and the source completes the operation at the moment that the last bit of the message is passed to transport layer. The differences between the two approaches can be seen in FIG. 11 and FIG. 12.

RDMA Write-Record is an especially useful operation for datagrams as it has very low latency achieved by being able to directly write into allocated memory with a pre-determined data sink location. It also fits well into the semantics for sockets, in that it can easily be used within a send/recv semantic that is compatible with socket-based applications. The send side initiates a request, which completes as soon as the data are delivered to the UDP layer. In order to support a socket type interface, the receiver can then poll for the completion of an RDMA Write-Record operation. This method is also valid for a reliable transport, although in practice, the solution of polling on a signaling bit to determine completion is a lower-overhead method of performing an RDMA operation. In a reliable transport, the in-order and reliable delivery make the monitoring of what data are valid unnecessary.

RDMA Write-Record is somewhat similar to send with the solicited event verbs defined for iWARP. In send with solicited event, the target machine can receive a send, match it to a posted receive and signal an event, if the system supports such an operation (for example an interrupt). This differs from RDMA Write-Record as it is a two-sided operation, and it also creates an event at the target, where RDMA Write-Record simply creates a completion event queue element, that must be actively read in order to determine that the operation completed. RDMA Write-Record also has some similarities with the RDMA Write with immediate verb defined for Infini-Band networks. RDMA Write with immediate differs from our RDMA Write-Record as it requires that a receive be posted at the target to receive the immediate data. Our proposed solution does not require a posted receive whatsoever, making it a truly one-sided operation.

Comparison of RDMA Write Over RC and RDMA Write-Record Over UD

Packet Loss Design Considerations

In designing a networking solution operating over an unreliable transport, consideration must be made for packet loss, particularly if message sizes greater than the network MTU are supported. We have designed support for partial message placement through RDMA Write-Record. This allows for some data loss, for applications that can tolerate some packet loss. The performance benefits of this approach versus the whole message delivery provided by send/recv is has been illustrated.

WANs normally run using a 1500 byte maximum transmission unit (MTU), with applications using message sizes smaller than the MTU. Datagrams are technically defined up to a maximum size of 64 KB. Therefore, it is preferable to package each message sent over RDMA Write-Record as a complete unit that spans only one datagram packet, preferably the size of the network MTU. In order to enhance relatively error free local area network transmission performance, and make our solution compatible with varied network MTUs, we have designed in support for larger message sizes than the expected network or datagram MTU. This can lead to efficiency increases for applications that can use large messages over low-loss networks. Its use over existing WAN infrastructure, particularly congested networks, is limited as the penalty for packet loss can be high.

Typically, in the event of packet loss while sending large multi-packet datagram messages, the entire message must be discarded. This can be alleviated to some extent by the addition of a reliability mechanism for UDP, but it is preferable to have multiple independent requests in an environment with frequent packet loss. With the proposed changes to Ethernet, like CEE, that defines error free channels; systems can make use of large message sizes to increase efficiency.

In detailing the design of RDMA Write-Record, a distinction needs to be made between messages that are equal to or less than the maximum payload size of a datagram (for UDP datagrams must be less than 64K).

For RDMA write-record, the goal is to provide a datagram-based RDMA method that is not required to provide guaranteed delivery. In addition, as control messages can be easily lost, an additional goal is to prevent the transmissions of such control messages with the exception of initial setup/negotiation, where it is unavoidable. In the case of initiation, there must be a handshake between the source and target that establishes the acceptable STag, memory region length, PD ID, etc.

Upon reception of a message, the payload is written into memory. In one design variation, an entry is placed in the completion queue with the message's location (STag and offset) and size. The placement of these CQ entries should be an atomic operation, this guarantees that message delivered is consistent with the CQ entry. In a few number of special cases, the application can determine the validity of a memory area, therefore CQ entry placement is optional, but highly suggested. An alternative design is one where upon reception of the data, the payload is written into memory and a validity map data structure is updated indicating the size and location of valid data in memory. This second design alternative does not require the application to interface with the memory via the completion queue. In a third design alternative, the behavior of the validity map solution can replicated from the application's point of view by providing an instruction to the application that results in the completion queue being traversed where all notifications relating to a single STag are aggregated into a single data structure validity map which is passed to the application. This uses the architecture of the first design, but the semantics of the second design.

In the case where there is data loss, the size of allowed packets should be considered in order to provide a satisfactory method of dealing with loss. If DDP messages are permitted to be no larger than a maximum UDP payload, then the loss of a message produces no outstanding operation at the target, as the target never receives the one and only UDP message related to the DDP message. This causes an invisible (to the target) loss of data. As the data is never received, the target never creates a CQ entry (or validity map update) concerning it and there is no concern about the validity of data that is in memory as nothing was written.

It is important to note that there are multiple levels of abstraction. There may be many individual MTU sized datagrams, as a 64 KB UDP message will be split up into several smaller packets (most like 1.5K). The loss of any one of these individual packets then will cause the loss of the entire UDP message. UDP messages are received in their entirety by iWARP at the DDP layer (neglecting the MPA layer as it is not needed), so loss of packets below the 64 KB UDP message threshold is not required to be handled by iWARP. A message is always deliverable immediately for a <64 KB DDP reception as the entire message is contained within the single segment, and the packet is always marked as "is_last".

Many existing Ethernet solutions provide support for LRO, which handles the re-integration of messages larger than the network MTU (up to a given limit). Given that this is supported we would expect such support in a datagram iWARP NIC. But it is possible to reduce the largest DDP segment down to the network MTU (1.5K for typical Ethernet). This would technically increase the effectiveness of partial placement under packet loss conditions, but it greatly increases the overall number of message segments that must be processed, increasing both the number of required operations and the size of the validity map and other memory usage required for messages larger than the MTU. Messages over 1.5K must then be treated according to the rules for large messages as outlined below.

For large messages, a message is only deliverable when either an is_last flagged DDP segment arrives for the message, or the timeout value for that DDP message reaches zero. A timeout counter is started upon the first reception of a message segment. The timer only determines when that particular message will timeout. However, determining the best timeout period for a message can be difficult, so the default behavior is to have a long timeout and not deliver a timed out message as it is most probably too stale to be of use. We can let the application help in determining what an appropriate timeout should be for a message, in the case that the application has a hard deadline on the reception of data. Based on the timeout and the required behavior, we can then either deliver a partial message after the timeout or not deliver the completion and just declare the data as invalid. This behavior would depend on the expectation of the usefulness of data after a given timeout period (i.e., if it's too stale, just discard it).

The need for a method of determining the valid portions of memory is paramount in such a system. If we wish to support DDP messages in excess of the UDP payload size, then we need to account for in-progress transactions at the target, in addition to the potential for the loss of one or more DDP segments in a single message. As the target does not know the size of the message being received until it receives the final DDP segment in a given DDP message (designated using the is_last flag in the DDP header), we must account for the case in which the last DDP segment is lost and segments from a previous message are included in the delivery of another DDP message. As such we can account for this possibility by using a message sequence number similar to that used in the untagged iWARP model. This message sequence number is added onto the existing DDP header and to indicate that such an addition has been made, we use one of the reserved bits in the DDP tagged header to indicate that an MSN is present. The message sequence number is not incremented per DDP segment, only by DDP message. This allows for the organization of incoming DDP segments that can be sorted by MSN, STag, offset and source IP. We can therefore have one MSN per IP/Port sending to the STag. This amount of stored information at first seems onerous, (MSN, STag, offsets for a validity map, plus the source IP of the sender) but its advantage over a connection-based system is that we only store state information for currently active operations, so having many clients able to send to a single STag consumes no extra memory at the target. Memory for storing active transactions is only consumed for clients with transmissions in progress. As the number of actively communicating systems is typically not excessively high, this approach scales well.

Given the four criteria of MSN, Stag, offset and source IP, we can separate messages from those of other systems as well as those that might belong to messages that have not been fully completed (by reception of the last DDP segment). Technically, partial placement may occur given the loss of the last DDP segment. It may be possible that a message can be delivered (partial placement) if a message with a greater MSN is delivered, which helps to reduce the problem with choosing a good timeout value. However, this can introduce significant complexity to ensure that the CQ entries created are consistent with the memory at the time they are entered in the queue. We have to match written memory regions to determine if one message overlapped with the other. Therefore, in some embodiments, it is one option to have only one MSN active for a given IP/port & STag at any one time. When a message segment arrives with an MSN greater than that of another outstanding operation on that STag/IP/port, we discard the previous message and do not deliver it. When a message is completed, several pieces of information can be supplied to the target machine through the completion queue, or written into the appropriate location in a validity map. For the CQ method, the STag, offsets and length are required to determine the valid areas of memory. These can be provided as is in an array, or may be aggregated to form a single memory location (STag & offset) and length, should the message be completed without loss. The length of the message is determined while the communication is outstanding by tracking an accumulator variable for that operation corresponding to the lengths of all of the segments written into memory. Given these behaviors, partial placement is only useful for applications that can tolerate data loss, and if the partial placement of arrived data is not contiguous, then the applications must be designed such that they are aware of non-contiguous buffer placement.

Determining the Validity of Individual Message Segments

We perform a cyclic redundancy check (CRC) on individual message segments, not the whole message. UDP allows for a CRC check to occur on individual whole messages (<64K) (end-to-end). Therefore, such a CRC check may be redundant. However, it is possible to not have a CRC check at the UDP level and we therefore assume that we must perform such a check at the iWARP level to verify the correctness of data. In a hardware implementation, we can ensure that we only use one of the CRCs and no duplication of checksum operations would occur.

Software Implementation

The software implementation of datagram-iWARP was developed using a TCP-based iWARP implementation from an article entitled "Design and Implementation of the iWARP Protocol in Software" by D. Dalessandro, A. Devulapalli, P. Wyckoff, as published in *Parallel and Distributed Computing and Systems* (PDCS'05), Phoenix, Ariz., November 2005. A socket interface was added, which is described in more detail herein.

Figure 13:
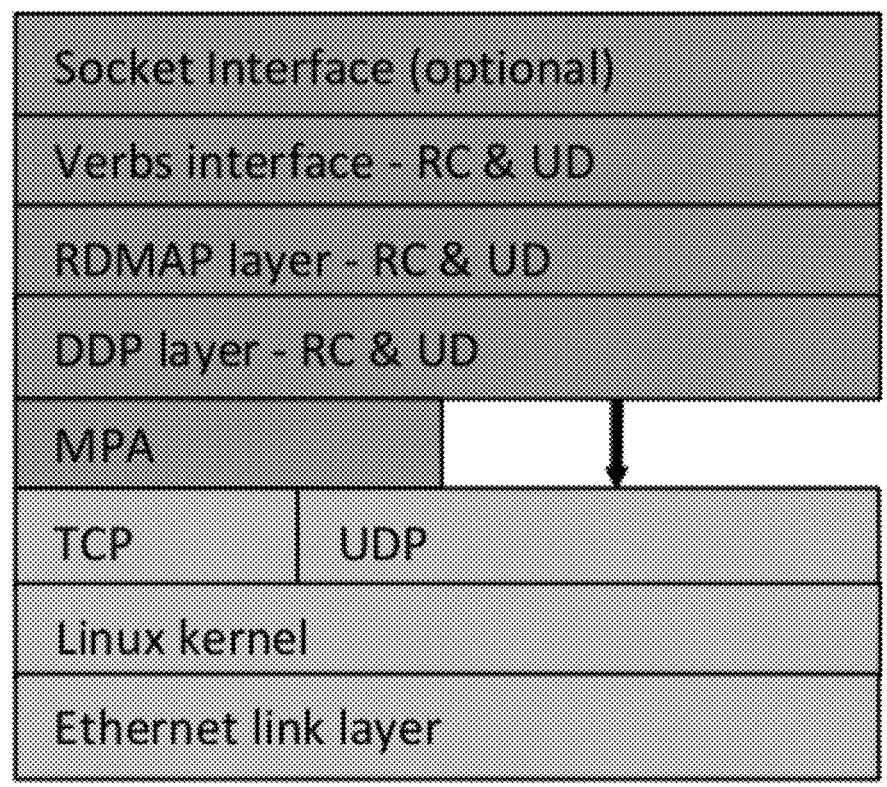
FIG. 13 illustrates an expanded stack for one embodiment of an implementation of datagram-iWARP.

The software implementation replicates the functioning of all of the iWARP layers as a user-level library. It provides a verbs interface that applications can use to interact with the iWARP stack. The expanded stack is shown in FIG. 13. The changes required to the verbs, RDMAP, and DDP layers as described herein were implemented in this software stack. In addition, changes were required to the code to allow for the use of datagram transports at a lower layer that would not be required in a hardware implementation of datagram-iWARP. Our software implementation takes advantage of I/O vectors to minimize data copying and enhance performance. In addition, it requires the use of CRC at the DDP layer to ensure correct reception of individual packets.

iWARP Socket Interface

The iWARP socket interface was one embodiment of a user level interface designed to serve as a layer that translates the socket networking calls of applications over to use the verb semantics of iWARP. This has the significant benefit of allowing existing applications to take advantage of the performance of iWARP while not requiring that they be re-developed to use the verbs interface. This interface is a proof of concept showing that it is possible to write a user-level interface for socket applications to directly use datagram-iWARP hardware. Such functionality is provided for reliable connection-based RDMA through the Sockets Direct Protocol (SDP). The functionality could be adapted by those of ordinary skill in the art to offer functionality for datagram-based traffic. Therefore, our socket interface should be regarded as a demonstration that such functionality could be implemented in a full SDP-like protocol specification. In order to fairly compare the UD vs. RC results, support for both UD and RC operations has been included in our socket interface implementation.

Design

This embodiment of a socket interface works by dynamically preloading it before running an application, overriding the operating system networking calls to sockets, re-directing them to use iWARP sockets instead. Unlike SDP, this embodiment does not override the creation of sockets, only the data operations related to them, and does not seek to replicate datagram socket behavior like SDP does for TCP. As such, it uses the socket initialized by the application directly over the iWARP software stack. In a hardware solution, this design would be expanded to override all socket creation as well, so that the relevant hardware QP could be created and associated with a "dummy" file descriptor number, and a full protocol specification could be developed to enable more efficient use of RDMA Write-Record.

The iWARP socket interface embodied herein operates by allowing for both TCP and UDP-based iWARP sockets to be opened, using the relevant iWARP lower layer protocol. It tracks the socket to QP matching so that each socket is only associated with a single QP. For datagram-iWARP, the work request posted to the QP is assigned a destination address at the time of a send.

UD iWARP Vs. RC iWARP Verbs Latency

When a call is intercepted, the interface determines the type of socket that is performing the request, and uses either RC or UD as appropriate for the socket type. Information about the destination address, source address or port is not stored in the interface, only the QP to file descriptor mapping and whether the file descriptor has been previously initialized as an iWARP socket. The remaining required information is stored in the socket data structure.

This solution is much more lightweight than traditional SDP, but less robust as applications can modify sockets. As such this embodiment is suitable for determining the performance of datagram-iWARP with some popular socket-based applications. However, other embodiments may alter the existing SDP standard in order to adapt it specifically to use a datagram semantic. Such an addition to the SDP protocol would be lengthy and require major changes or additions to the existing standard. Our goal with the iWARP socket interface is to demonstrate that a datagram socket to verbs translation is possible, and demonstrate the potential benefits that datagram-iWARP could bring to existing datagram sockets-based applications.

Experimental Results and Analysis

This section details the experimental platform used for performance testing the datagram-iWARP implementation. It also reviews the performance results of verbs level microbenchmarks for all of the discussed modes of operation, and investigates the performance of two applications, a media streaming application VLC (As available from the VideoLan Project at http://www.videolan.org/vlc/) and a Session Initial Protocol (SIP) application/benchmark SIPp (As available from http://sipp.sourceforge.net/).

The experimental results were run on two nodes, each with two quad-core 2 GHz AMD Opteron processors with a 512 KB L2 cache per core and 8 MB shared L3 cache per processor chip, 8 GB RAM and a NetEffect 10-Gigabit Ethernet (10 GE) card connected through a Fujitsu 10-Gigabit Ethernet switch. The OS used was Fedora Core 12 (kernel 2.6.31).

Microbenchmark Performance Results

Latency and Bandwidth

Figure 14A:
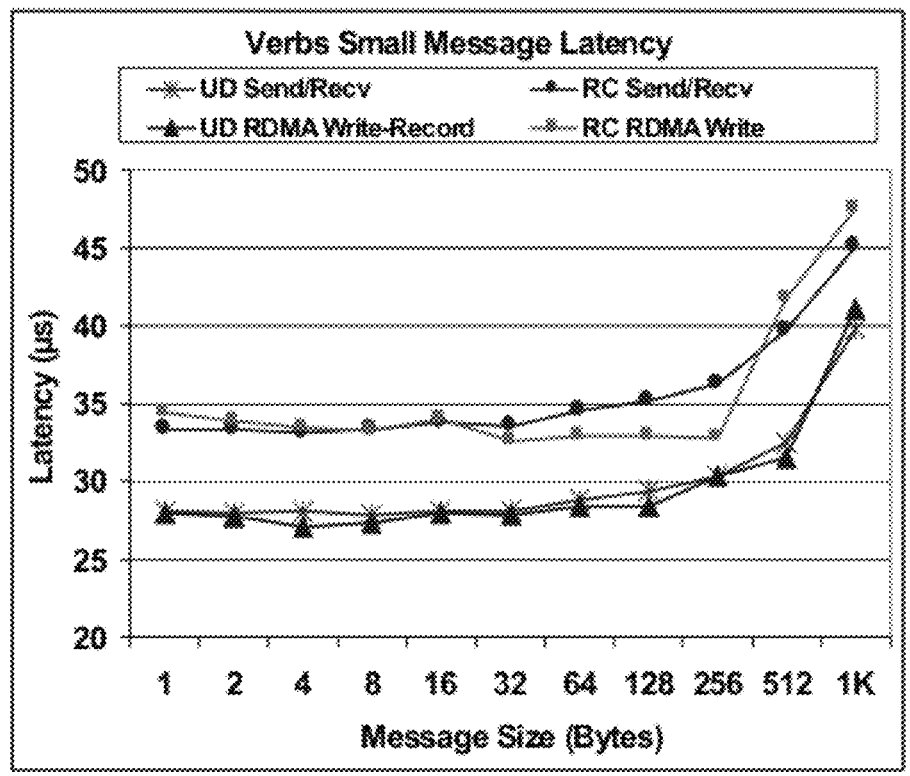
FIGS. 14A-14C show results of a verbs latency test of datagram iWARP for send/recv, Reliable Connection (RC) RDMA write and Unreliable Datagram (UD) RDMA Write-Record.
Figure 14B:
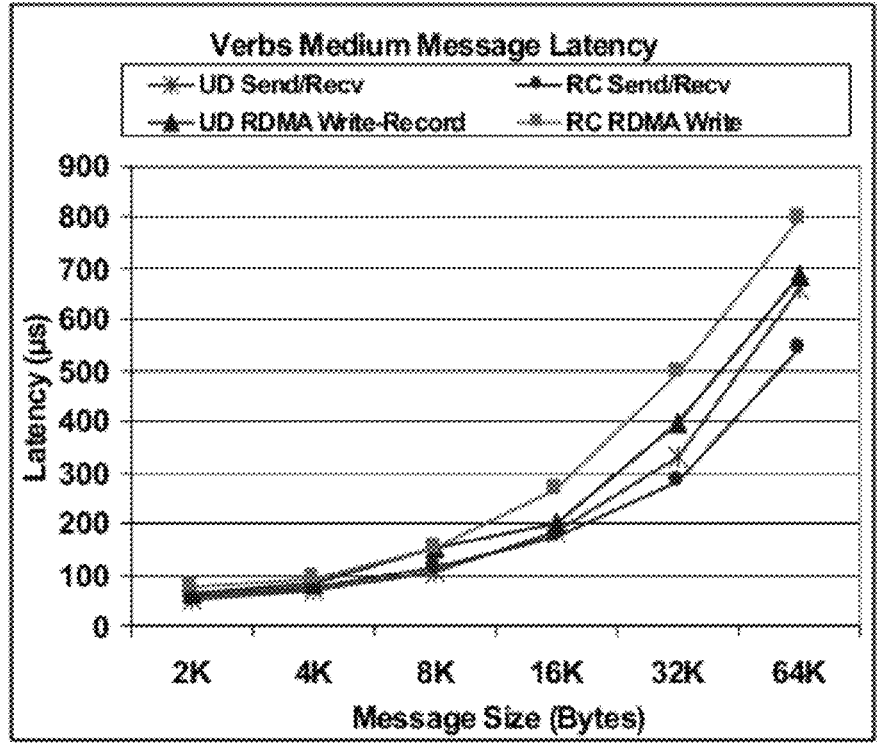
Figure 14C:
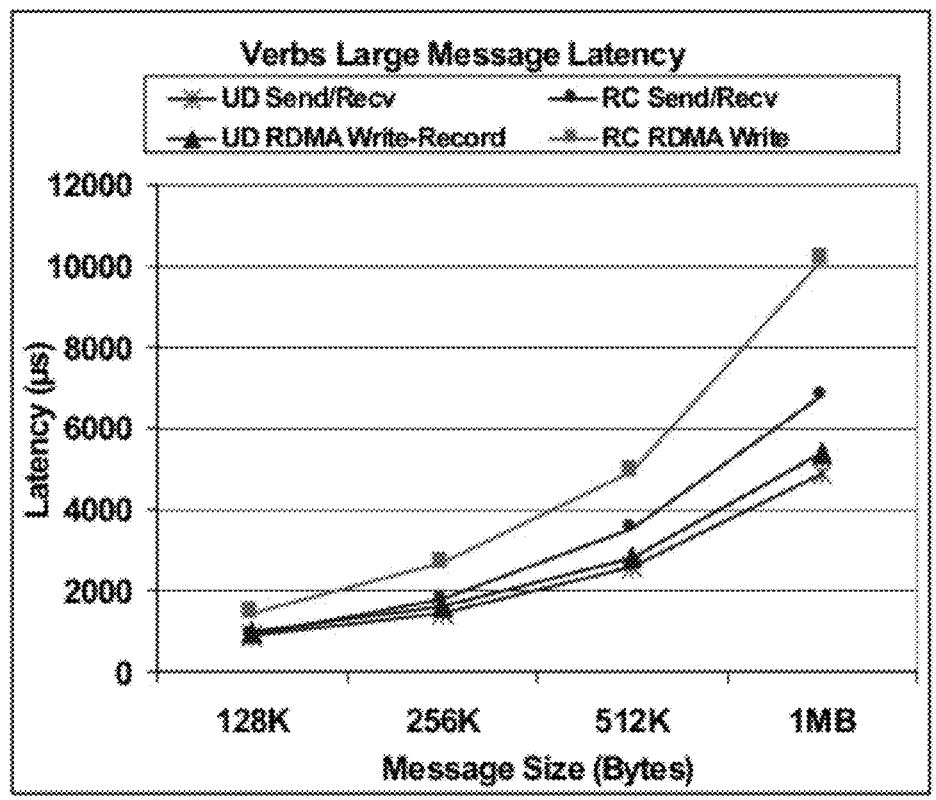

The results of the verbs latency of datagram iWARP are shown in FIGS. 14A-14C, for send/recv, RC RDMA write and UD RDMA Write-Record. We can observe that the lowest latencies for small messages are UD send/recv and UD RDMA Write-Record, which are in the range of 27-28 μs for messages less than 128 bytes.

Therefore in terms of latency datagram-iWARP is consistently better than RC send/recv and RC RDMA Write, which has latency around 33 μs for messages under 128 bytes long. For message sizes up to 2 KB, UD send/recv offers a 18.1% improvement in latency over RC send/recv iWARP, while UD RDMA Write-Record offers a 24.4% improvement over RC RDMA write.

Figure 15:
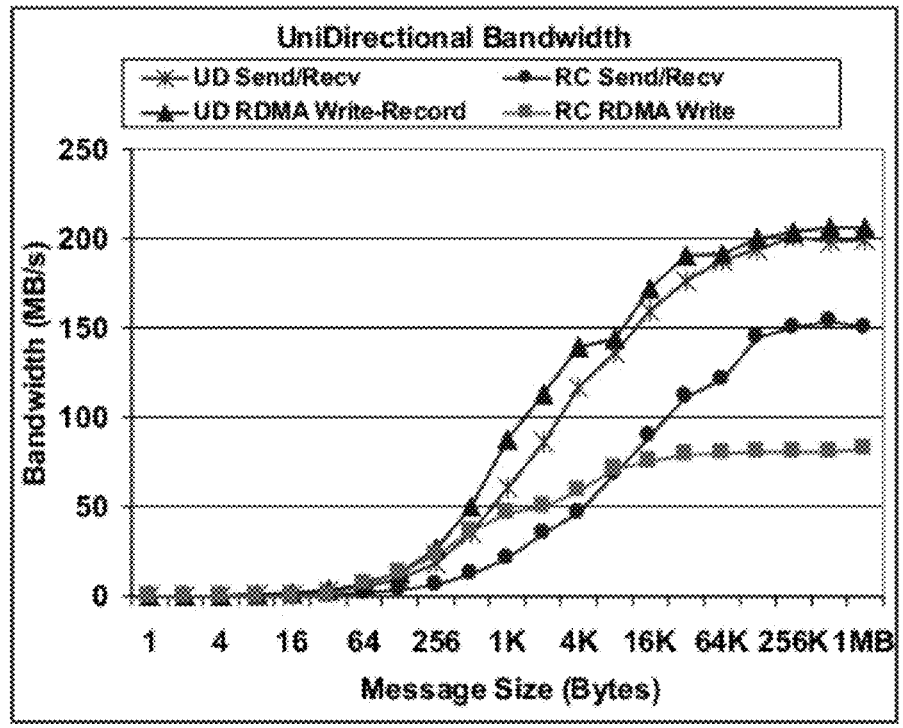
FIG. 15 shows the unidirectional bandwidth in which one side is sending back-to-back messages of the same size to another side.

FIG. 15 shows the unidirectional bandwidth in which one side is sending back-to-back messages of the same size to the other side. The performance of messages between 1 KB and 1.5 KB is of great importance as such message sizes are the most likely to be used in the delivery of media. For 1 KB messages UD RDMA Write-Record has a bandwidth of 188.8% higher than RC RDMA Write and UD send/recv has a maximum bandwidth of 193% higher than that of RC send/recv.

Unidirectional Verbs Bandwidth

For messages larger than 1.5 KB, multiple datagrams comprise a single message, and they are recombined at the receiver to form the full message. Such a scheme is only useful in networks with low packet loss rates, but the results in such an environment are excellent. We find that for very large messages, UD RDMA Write-Record is the dominant method. Examining the bandwidth results for large messages (larger than 128 KB) in FIG. 15, we can observe that UD iWARP provides the best results. UD send/recv offers a maximum of 33.4% improvement over RC send/recv occurring at 256 KB messages. Most importantly, RDMA Write-Record has a significant 256% advantage at message sizes of 512 KB over RC RDMA Write.

Packet Loss and Performance

Figure 16:
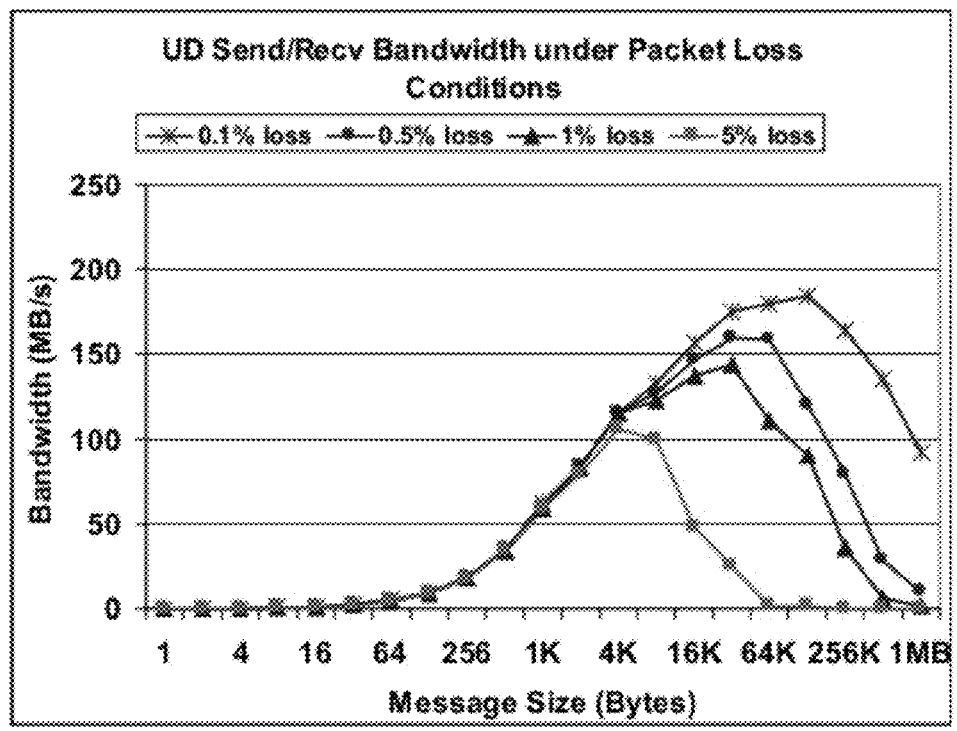
FIG. 16 shows the bandwidth of UD send/recv datagram-iWARP under various packet loss conditions.

In order to study the proposed system under packet loss conditions, the Linux traffic control provisions were used. Using the traffic control mechanisms, a FIFO queue that normally dequeues messages as fast as they can be delivered to the underlying hardware was configured to drop packets at a defined rate. By examining the bandwidth of UD send/recv datagram-iWARP under various packet loss conditions in FIG. 16, we can see that the theoretical evaluation done in the design stage follows the results seen under real conditions. For the UD send/recv mode, the impact of packet loss is significant for large message sizes even under very low packet loss conditions. A loss rate of 0.1% is close to the observed packet loss rates for intra-US web traffic, while a 0.5% loss rate is in line with expectations of loss between a western European-US transmission. Packet loss rates of 1-5% are observable for traffic to such locations as Africa and parts of Asia. As such we can observe that the solution of partial delivery of messages improves performance over the required full message delivery used in our send/recv method.

UD Send/Recv Bandwidth Under Packet Loss Conditions

Figure 17:
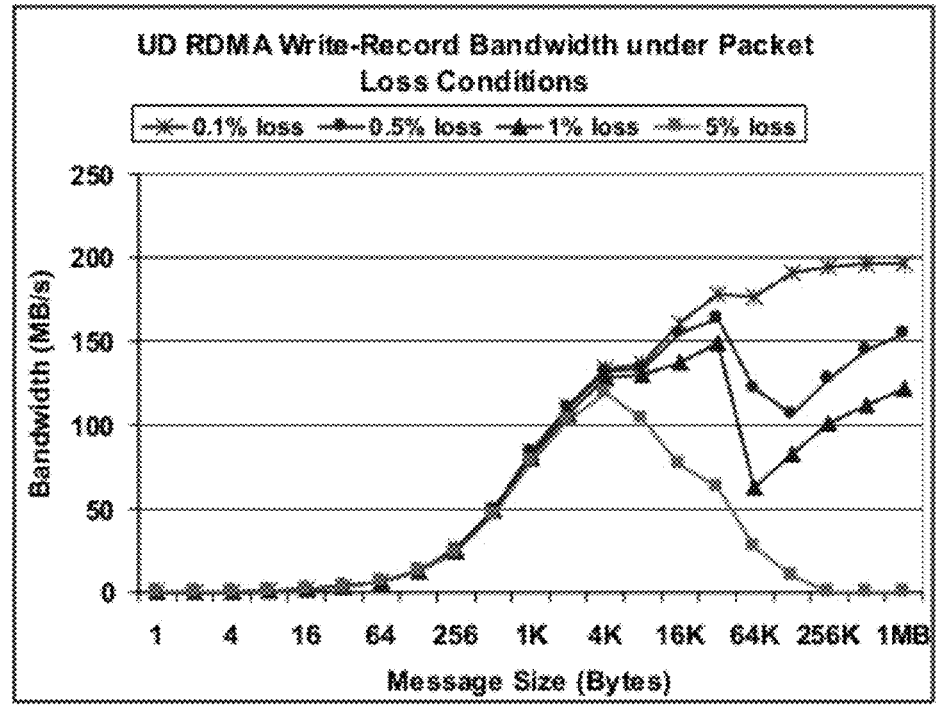
FIG. 17 illustrates that the partial RDMA Write-Record method performs better in low packet loss conditions even for larger message sizes.

FIG. 17 illustrates that the partial RDMA Write-Record method performs better in low packet loss conditions even for larger message sizes. We observe a drop at 64 KB messages as these messages exceed the maximum sized MTU of the UDP layer, requiring multiple UDP messages. For messages under 64 KB and greater than the network MTU of 1500 bytes, multiple packets are segmented at the sender and recombined at the target machine and delivered by the UDP layer as a single large message. Any loss of the smaller packets making up this large UDP packet results in the entire (up to 64 KB) message being dropped. The partial placement feature of RDMA Write-Record makes it capable of maintaining high bandwidth under packet loss conditions. However, high packet loss rates can cause total breakdown of the bandwidth, as the final packet must arrive for the partial message to be placed into memory. Loss of this final packet results in the loss of the entire message. Therefore, large loss rates (~5%) can lead to very low throughput.

Overall, we can observe that datagram iWARP clearly has great benefits in terms of bandwidth for our software implementation. We would therefore expect that the hardware proposed by this proof of concept would have excellent throughput, although obviously limited in its maximum bandwidth by the link speed itself. These performance results show that such a scheme can provide high bandwidth, while in hardware, requiring no CPU intervention.

The effectiveness of iWARP UD RDMA Write-Record is clear in that it has latency comparable to the best alternative method (UD send/recv), and it clearly has the best bandwidth performance of any of the methods. In Ethernet networking in a commercial environment, the bandwidth performance is much more important than the latency performance, as even moderately sized transmission ranges lessen the impact of the lowered latency at the system side.

UD RDMA Write-Record Bandwidth Under Packet Loss Conditions
Application Results

The embodied iWARP socket interface has been tested using a variety of custom coded socket tests, as well as testing using widely accepted socket based software. It is designed to work over any application that uses a datagram or stream socket. It has been tested with VideoLan's VLC a popular media streaming application as well as SIPp, a testing framework for load testing SIP servers.

Figure 18:
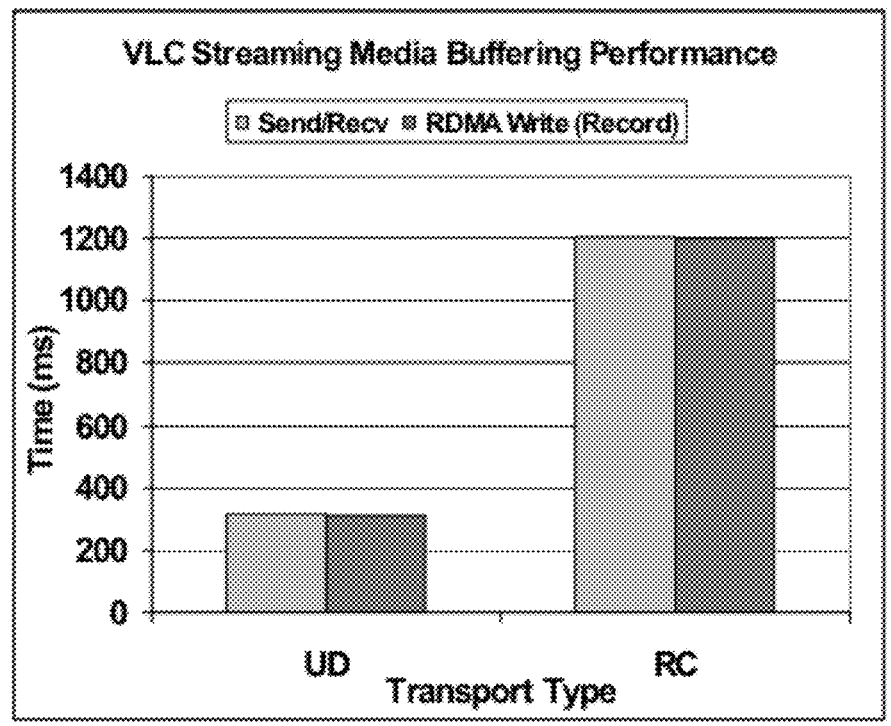
FIG. 18 compares a UDP video streaming mode with an RC compatible mode (HTTP-based) for a UD vs. RC comparison.

VideoLan's VLC media player—VLC was chosen for performance testing of datagram iWARP. In order to assess datagram-iWARP's real world performance benefits for a media streaming application it was necessary to compare VLC's UDP streaming mode with an RC compatible mode (HTTP-based) for a UD vs. RC comparison. In comparing the two approaches as seen in FIG. 18, we can observe that the UD mode of operation results in a 74.1% reduction in media initial buffering time over the HTTP-based RC alternative. This represents a significant increase in throughput for the system of almost three times the throughput of a RC based system. However, it should be noted that there is more inherent overhead involved in the HTTP based method, and therefore the performance gap between the application modes is due only partially to the datagram-iWARP to RC-iWARP difference.

VLC UD Streaming Vs. RC-Based HTTP Streaming

It can be observed that the performance difference between send/recv and RDMA Write-Record is minimal. This is due to the need in the software socket interface to provide support for many buffers passed into a single socket. In order to effectively support the use of multiple buffers on a single socket, we have elected not to re-exchange (advertise) remote buffer locations for every new buffer due to the required overhead and subsequently reduced performance, but to copy the data over to the supplied buffer location instead. This makes both RDMA Write-Record and send/recv almost identical in terms of performance when using our socket interface. Therefore, in the next sub-section, we will present the UD results as a single performance number instead of separating the results out for both methods. Other embodiments may use zero-copy for large message sizes and buffered copy for smaller messages to enhance performance similar to SDP's buffered copy/zero copy methods thereby allowing for a differentiation in real-world performance. This could also increase memory efficiency, as intermediary buffers would not be required for large messages, as they are written directly into the application buffer.

SIPp Server/Client

Figure 19:
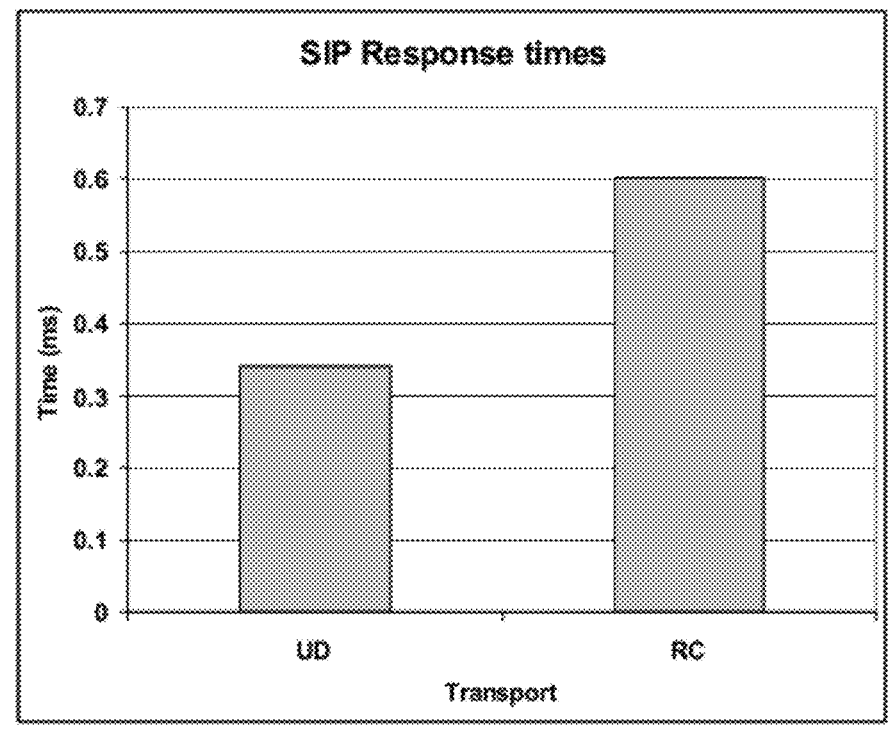
FIG. 19 compares Session Initiation Protocol (SIP) response times for UD vs. RC transport.

We have examined the base response time for interaction with the SIPp server. For request/responses under a server under light load, we found the request response averages seen in FIG. 19. We observe that the UD-iWARP response time is a 43.1% improvement over that of RC-iWARP. This can be attributed to the TCP overhead incurred.

Figure 20:
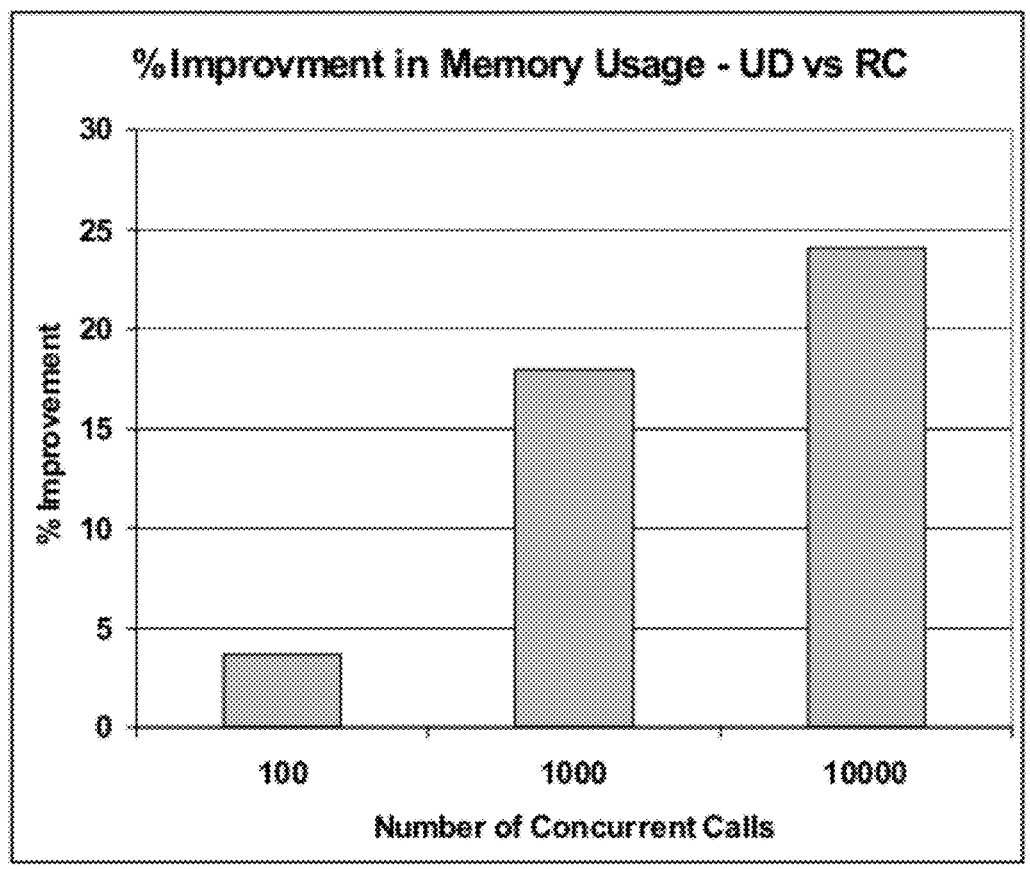
FIG. 20 details the memory savings that are possible when using datagram-iWARP on a SIP server compared to RC in such a scenario.

Using SIPp we have investigated the overall memory benefits of using datagram-iWARP over traditional RC iWARP. A SIPp server and client were generated and configured as a client and server using a basic SipStone client-server test. FIG. 20 details the memory savings that are possible when using datagram-iWARP on a SIP server compared to RC in such a scenario. The memory savings were calculated using the sum of the SIPp application memory usage and the allocated slab buffer space used to create the required sockets. This means that the memory usage is a whole application space (including iWARP memory usage) memory usage comparison including kernel space memory for the sockets. SIPp was configured to generate a load emulating many clients, which creates a single UDP port for each client. We find that at 10000 clients, we have a memory savings of 24.1%. Theoretical calculations based solely on the iWARP socket size (using one socket per client) predict that such a case would result in a 28.1% memory improvement over RC. The resulting 4% difference can be directly attributed to the application's memory usage, which would require some additional book keeping to keep track of the states of the calls over the UDP ports to determine when to close the ports. Although the actual amount of memory used in this test is not excessive, it can become more onerous on systems supporting hundreds of thousands to millions of clients.

SIP Response Times
Sip Improvement in Memory Usage Using Datagram-iWARP Over Traditional iWARP We have measured the overhead caused by using the datagram-iWARP socket interface when doing the most network intensive task available during video streaming, the pre-buffering required before beginning playback. We have found a very minimal approximate 2% increase in overall pre-buffering time when using our socket interface. As such, the interface has very low overhead. Therefore, we can conclude that for such applications, the software iWARP solution is viable, and a hardware iWARP solution should therefore be able to significantly improve performance while having very little overhead running over a software socket interface.

Conclusions

Datagram-iWARP has been shown to be effective in both HPC and datacenter environments. The advantages of a scalable connectionless transport are numerous and the efficiency improvements that can be realized are significant. As datagram traffic is expected to dominate future WAN traffic, the inclusion of datagram support for modern high performance interconnects is an important step in broadening the application space for RDMA-enabled network technologies. This disclosure provides RDMA over unreliable datagrams, and is consequently very scalable. As unreliable datagrams become an ever-growing majority of Internet traffic this proposal provides the opportunity to expand RDMA technologies to a majority of applications and traffic, particularly high bandwidth applications that are likely to use datagrams.

In this disclosure we have provided a design for a full featured datagram-iWARP solution. We have disclosed a new RDMA operation, RDMA Write-Record, which can be utilized on any RDMA-enabled network, including datagram-iWARP. In addition, we have implemented and tested both a fully functional software datagram-iWARP stack as well as a socket interface for providing iWARP functionality to existing socket-based applications. The performance of the datagram-iWARP send/recv and one-sided RDMA operations were explored with real data center applications, finding that one-sided RDMA Write-Record can have significant performance benefits over send/recv. It was found that the bandwidth of datagram-iWARP can exceed that of traditional iWARP by up to 256% for RDMA operations using large message, and that RDMA Write-Record can outperform RC RDMA Write with up to a 24.4% improvement in latency. It was also discovered that the overhead of the software iWARP socket interface is minimal.

We have examined the bandwidth performance of iWARP under various packet loss scenarios and determined the MTUs most appropriate for given network conditions. We also determined that the considerations that we made for packet loss have had the desired effect on the overall bandwidth; providing increased bandwidth and partial delivery for those applications that can take advantage of such features.

We evaluated the performance of some real-world applications, which demonstrated that datagram-iWARP is useful in such contexts. It was observed that the real-world memory scalability and performance of datagram iWARP over SIP is excellent, providing a memory savings of 24.1% and performance improvement of 43.1%, and that performance over VLC can outperform RC by 74.1%. These benefits will scale well with large commercial clusters. We have shown that sockets-based applications can take advantage of datagram-iWARP, and that it would be beneficial to develop a protocol similar to SDP, but for datagrams, that will leverage the advantages of RDMA Write-Record for socket applications, to translate the verbs performance benefits of Write-Record over to the sockets domain.

Embodiments discussed have been described by way of example in this specification. It will be apparent to those skilled in the art that the forgoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of processing elements or sequences, or the use of numbers, letters, or other designations therefore, is not intended to limit the claims to any order, except as may be specified in the claims. Accordingly, the invention is limited only by the following claims and equivalents thereto.

What is claimed is:

1. A communication stack for providing remote direct memory access (RDMA) over a datagram network, the communication stack comprising:

a user level interface configured to accept datagram related input and communicate with an RDMA enabled network interface card (NIC) via an NIC driver;

an RDMA protocol layer configured to supply one or more data transfer primitives for the datagram related input of the user level; and a direct data placement (DDP) layer configured to transfer the datagram related input from a user storage to a transport layer based on the one or more data transfer primitives by way of a lower layer protocol (LLP) over the datagram network as one or more DDP messages where each DDP message is encapsulated into one User datagram protocol (UDP) datagram and UDP datagrams will arrive at the LLP in their entirety, and where the RDMA protocol layer and the DDP layer are combined into a single layer.

2. The communication stack of claim 1, wherein the datagram network comprises an unreliable datagram network.

3. The communication stack of claim 1, wherein the datagram network comprises a non-stream based reliable datagram network.

4. The communication stack of claim 1, wherein the LLP comprises User Datagram Protocol (UDP).

5. The communication stack of claim 1, wherein the one or more data transfer primitives for the datagram related input of the user level interface comprise one or more work requests (WR) in a queue pair (QP) data structure.

6. The communication stack of claim 5, wherein the DDP layer transfers the datagram related input from the user storage to the transport layer by way of one or more previously created LLP sockets.

7. The communication stack of claim 6, wherein one of the one or more previously created LLP sockets is used for each QP.

8. The communication stack of claim 5, wherein the WR is considered complete as soon as it is accepted by the LLP for delivery.

9. The communication stack of claim 1, wherein the DDP layer is configured to transfer the datagram related input from the user storage to the transport layer without an adaptation layer to put boundaries on DDP messages.

10. The communication stack of claim 1, wherein the RDMA protocol layer is configured to continue supplying the one or more data transfer primitives for transfer of data, without instructing a premature end of data transmission or a need for retransmission when a transmission failure is indicated.

11. The communication stack of claim 1, wherein the user level interface is further configured to accept connection based input in addition to the datagram related input.

12. The communication stack of claim 1, wherein the user level interface at least partially comprises a protocol selected from the group consisting of internet wide area RDMA protocol (iWARP) and InfiniBand.

13. The communication stack of claim 1, wherein the one or more data transfer primitives are configured to implement send/receive datagram support.

14. The communication stack of claim 1, wherein the DDP layer is further configured to receive a datagram related input from the transport layer based on one of the one or more data transfer primitives by way of the LLP over the datagram network.

15. The communication stack of claim 14, wherein the DDP layer does not determine an order of the received datagram.

16. The communication stack of claim 14, wherein the DDP layer creates a target completion record after successfully receiving the datagram related input such that the completion record may be read by a target to determine that a write operation has completed at the target.

17. A communication system, comprising:
a datagram network;
source network circuitry;
target network circuitry coupled to the source network circuitry via the datagram network; and wherein:
  a) the source network circuitry is configured to:
    1) supply one or more data transfer primitives for a datagram related input from a user level interface and communicate with a remote direct memory access (RDMA) enabled network interface card (NIC) via an NIC driver through a RDMA protocol layer; and
    2) transfer the datagram related input from a direct data placement (DDP) layer configured to transfer the datagram related input from a source storage to a transport layer based on the one or more data transfer primitives by way of a lower layer protocol (LLP) over the datagram network as one or more DDP messages, wherein each DDP message is encapsulated into one User datagram protocol (UDP) datagram and UDP datagrams will arrive at the LLP in their entirety, and wherein the RDMA protocol layer and the DDP layer are combined into a single layer; and
  b) the target network circuitry is configured to:
    1) receive the datagram related input from the transport layer based on the one or more data transfer primitives by way of the LLP over the datagram network.

18. The communication system of claim 17, wherein the data transfer primitives instruct the target network circuitry to implement write-record datagram support.

19. The communication system of claim 17, wherein the datagram network is unreliable.

20. The communication system of claim 17, wherein the target network circuitry does not determine an order of the received datagram.

21. The communication system of claim 17, wherein the target network circuitry is further configured to create a target completion record after successfully receiving the datagram related input.

22. Circuitry for providing remote direct memory access (RDMA) over a datagram network, the circuitry comprising:
an RDMA enabled network interface card (NIC);
a user level interface configured to accept datagram related input and communicate with the RDMA enabled NIC;
an RDMA protocol layer configured to supply one or more data transfer primitives for the datagram related input of the user level interface; and
a direct data placement (DDP) layer configured to transfer the datagram related input from a user storage to a transport layer based on the one or more data transfer primitives by way of a lower layer protocol (LLP) over the datagram network where each DDP message is encapsulated into one User datagram protocol (UDP) datagram and UDP datagrams will arrive at the LLP in their entirety, and where the RDMA protocol layer and the DDP layer are combined into a single layer.

23. A method for providing remote direct memory access (RDMA) over a datagram network, the method comprising:
accepting a datagram related input via a user level interface configured to communicate with an RDMA enabled network interface card (NIC) via an NIC driver;
using an RDMA protocol layer on an RDMA enabled network interface card (NIC), supplying one or more data transfer primitives for the accepted datagram related input; and
transferring the datagram related input with a direct data placement (DDP) layer from a user storage to a transport layer based on the one or more data transfer primitives by way of a lower layer protocol (LLP) as one or more DDP messages over the datagram network without an adaptation layer to put boundaries on the messages, where each DDP message is encapsulated into one User datagram protocol (UDP) datagram and UDP datagrams will arrive at the LLP in their entirety, and where the RDMA protocol layer and the DDP layer are combined into a single layer.

24. The method of claim 23, further comprising continuing to supply the one or more data transfer primitives for the accepted datagram related input without an adaptation layer to put boundaries on the accepted datagram.

25. The method of claim 1, further comprising not needing a MPA layer.

26. The method of claim 1, further comprising error messages are reported locally and not to other side of the network.

27. The method of claim 26, further comprising using an error message that identifies the erroneous message number using a Message Sequence Number and placed into an Error queue.

28. The communication stack of claim 1, wherein the one or more data transfer primitives are configured to implement read/write datagram support.

29. The communication stack of claim 1, wherein the one or more data transfer primitives are configured to implement write-record datagram support.

* * * * *